US008369185B2

(12) United States Patent  (10) Patent No.: US 8,369,185 B2
Fleming et al.  (45) Date of Patent: Feb. 5, 2013

(54) INTER-DIVER SIGNALING DEVICE AND PROCESS

(76) Inventors: Robert Alan Fleming, Nicasio, CA (US); Cherie Elaine Kushner, Nicasio, CA (US)

( * ) Notice: Subject to any disclaimer, the term of this patent is extended or adjusted under 35 U.S.C. 154(b) by 0 days.

(21) Appl. No.: 13/373,111

(22) Filed: Nov. 5, 2011

(65) Prior Publication Data

US 2012/0113755 A1  May 10, 2012

Related U.S. Application Data

(62) Division of application No. 12/152,725, filed on May 15, 2008, now Pat. No. 8,094,518.

(60) Provisional application No. 60/933,342, filed on Jun. 5, 2007.

(51) Int. Cl.
*H04B 11/00* (2006.01)
(52) U.S. Cl. ............................ 367/134; 367/910
(58) Field of Classification Search .................. 367/134, 367/910
See application file for complete search history.

(56) References Cited

U.S. PATENT DOCUMENTS

| 5,523,982 | A | * | 6/1996 | Dale | 367/131 |
| 5,899,204 | A | * | 5/1999 | Cochran | 128/205.23 |
| 5,956,291 | A | * | 9/1999 | Nehemiah et al. | 367/131 |
| 7,872,946 | B1 | * | 1/2011 | Bustamante et al. | 367/134 |
| 2007/0280053 | A1 | * | 12/2007 | Polany et al. | 367/131 |
| 2010/0064827 | A1 | * | 3/2010 | Dakin | 73/865.1 |

* cited by examiner

*Primary Examiner* — Ian Lobo
(74) *Attorney, Agent, or Firm* — Integral Patent; Laurence J. Shaw

(57) ABSTRACT

Taps on a beam-interrupt button of an underwater signaling transceiver are encoded as binary frequency shift-key modulated Golay codes, which are transmitted via 56-58 kHz compression waves generated by a ring-shaped electromechanical transducer. Light emitting diodes flash to signal the content of received signals and provide monitoring of the distance between divers. All components of the transceiver—except outer portions of input/output leads and a suction cup for attaching to the transceiver to a diver's mask—are completely encased in transparent plastic. The input/output leads allow an internal battery to be recharged, provide access to the internal processor for programming and data retrieval, and monitor whether the transceiver is submerged so that the transceiver can operate in an underwater mode or an above-water mode. Transceivers only communicate with other transceivers which use the same communication channel. Transceivers monitor their separation distances and flash a warning signal when nearing an out-of-range condition.

19 Claims, 18 Drawing Sheets

FIG. 7 (REPLACEMENT SHEET)

INTER-DIVER SIGNALING DEVICE AND PROCESS

RELATED APPLICATIONS

The present non-provisional patent application is a divisional application which is based on and claims the priority of non-provisional patent application Ser. No. 12/152,725, filed May 15, 2008 now U.S. Pat. No. 8,094,518, by the same inventors and having the same title, which in turn is based on and claims the priority of provisional patent application Ser. No. 60/933,342, filed Jun. 5, 2007, by the same inventors and having the same title.

FIELD OF THE INVENTION

The present invention is related to signaling and communication systems, and more particularly to underwater signaling and communication systems.

BACKGROUND OF THE INVENTION

Scuba diving is a popular recreational activity enjoyed by hundreds of thousands of people across the globe. However, because of the risks associated with scuba diving, one of the fundamental safety rules is that divers should dive with and be in communication with a companion diver, i.e., buddy. The most primitive method of attracting a companion diver's attention when out of visual contact is to bang a hard object, such as a knife, against the diver's air tank. However, this can be inconvenient and requires considerable effort. Furthermore, this method of signaling has a limited range because the ear does not couple reliably to sound waves in water, and other noises, such as the sounds made by a diver's breathing, tend to mask signaling sounds.

A wide variety of underwater communication devices have been proposed and manufactured. However, they generally suffer from the disadvantages of being unwieldy, and difficult to use, having a limited communication range, not specific to (i.e., private between) diver pairs or groups of divers, lacking reliability, or failing to function well.

Therefore it is an object of the present invention to provide an underwater communication system which is compact, easy to operate, specific, reliable, and has an extended communication range.

More particularly, it is an object of the present invention to provide underwater transceivers that communicate using ultrasonic compression waves.

Still more particularly, it is an object of the present invention to provide underwater transceivers that communicate using ultrasonic compression waves which are transmitted omni-directionally.

More particularly, it is an object of the present invention to provide underwater transceivers that communicate using ultrasonic compression waves in an environment which may produce echoes or phase shifts.

It is another object of the present invention to provide underwater transceivers whose components are not susceptible to damage due to water leakage.

More particularly, it is an object of the present invention to provide an underwater transceiver whose components, which include a rechargeable battery, are not susceptible to damage due to water leakage.

Still more particularly, it is an object of the present invention to provide an underwater transceiver whose components, which include a rechargeable battery, are not susceptible to damage due to water leakage, and where the charge level of the battery is ascertainable.

It is another object of the present invention to provide an underwater transceiver whose components are not susceptible to damage due to water leakage, and which is programmable and/or from which dive data can be extracted.

It is another object of the present invention to provide underwater transceivers which have different modes of operation when submerged and when not submerged.

It is another object of the present invention to provide an underwater communication system where divers are informed, visually, audibly and/or through tactile means, that communications have been received by their transceiver or by a companion transceiver.

It is another object of the present invention to provide underwater transceivers which monitor the separation distance between transceivers.

More particularly, it is an object of the present invention to provide underwater transceivers which monitor an inter-transceiver separation distance and inform divers when transceivers are near the limit of their communication range.

It is another object of the present invention to provide underwater transceivers with low power usage.

It is another object of the present invention to provide multiple groups of underwater transceivers where each transceiver within a group communicates over a communication channel used by that group.

And it is an object of the present invention to provide multiple groups of underwater transceivers where each transceiver within a group communicates over a communication channel used by that group, and where public channel communications are received by transceivers in all groups.

It is another object of the present invention to provide an underwater communication system with means for error detection and correction.

It is another object of the present invention to provide an underwater communication system which uses Golay codes.

It is another object of the present invention to provide an underwater communication system which uses binary frequency-shift key modulation.

It is another object of the present invention to provide a method for adapting air-environment lenses for use underwater.

It is another object of the present invention to provide a method for receiving sinusoid-based transmissions having a low signal-to-noise ratio.

It is another object of the present invention to provide an underwater sensing device that is not susceptible to damage due to water leakage into the device.

It is another object of the present invention to provide an underwater sensing device with an internal rechargeable battery that is not susceptible to damage due to water leakage into the device.

It is another object of the present invention to provide an underwater sensing device whose components are not susceptible to damage due to water leakage, and which is programmable and/or from which dive data can be extracted.

These and other objects of the present invention will become more apparent and will be better understood through reference to the subsequent detailed description considered in conjunction with the accompanying drawings.

SUMMARY OF THE INVENTION

The present invention is directed to an underwater sensing device having a power source, input/output leads, a computation unit powered by the power source for generating outgoing signals and processing incoming signals, a sensor for monitoring the state of a diving variable, and a chassis which completely encases the power source, computation unit, and the sensor. The chassis also encases interior portions of the input/output leads, but exterior portions of the input/output leads are exposed to the environment.

The present invention is also directed to an underwater transceiver having a power source, input/output leads, computation unit, electromechanical transducer, and beam-interrupt button. The beam-interrupt button has a light source which produces a light beam directed towards a light detector. The light source and light detector are separated by a gap which a diver can tap to create an interruption in the beam. Interruptions in the beam being are detected by the computation unit and transmitted via outgoing signals. The chassis completely encases the power source, input/output leads, computation unit, electromechanical transducer, light source and light detector. The chassis also encases interior portions of the input/output leads, but exterior portions of the input/output leads are exposed to the environment.

The present invention is also directed to method of communication between two divers wearing underwater signaling devices. When a first diver taps a beam-interrupt button on his underwater signaling device, the underwater signaling device interprets the tapping and sends out a compression wave communication signal. The underwater signaling device of the second diver receives and interprets the communication signal, and flashes a reception light signal visible to the second diver or emits an audible signal to the second diver corresponding to the tapping. The second diver's underwater signaling device then sends out a compression wave confirmation signal which the first diver's underwater signaling device receives and interprets, and then flashes a confirmation light signal visible to the first diver. The first diver's underwater signaling device determines the separation distance between the two underwater signaling devices based on the intensity of the compression wave confirmation signal.

The present invention is also directed to a method of communication between two divers wearing underwater signaling devices. When a first diver taps a beam-interrupt button on his underwater signaling device, the underwater signaling device interprets the tapping and sends out a compression wave communication signal. The underwater signaling device of the second diver receives and interprets the communication signal, and flashes a reception light signal visible to the second diver corresponding to the tapping and/or an audible signal audible to the second diver corresponding to the tapping. The second diver's underwater signaling device then sends out a compression wave confirmation signal which the first diver's underwater signaling device receives and interprets, and then flashes a confirmation light signal visible to the first diver. The first diver's underwater signaling device determines the round-trip communication time based on the elapsed time between the sending of the communication signal and the receipt of the confirmation signal.

The present invention is also directed to another method of communication between two divers wearing underwater signaling devices. When a first diver taps a beam-interrupt button on his underwater signaling device, the underwater signaling device interprets the tapping and sends out a compression wave communication signal. The underwater signaling device of the second diver receives and interprets the communication signal, and produces an audible signal for the second diver corresponding to the tapping. The second diver's underwater signaling device then sends out a compression wave confirmation signal for the first diver's underwater signaling device to receive and interpret.

The present invention is also directed to another method of communication between two divers wearing underwater signaling devices. When a first diver taps a beam-interrupt button on his underwater signaling device, the underwater signaling device interprets the tapping and sends out a compression wave communication signal. The underwater signaling device of the second diver receives and interprets the communication signal, and flashes a reception light signal visible to the second diver corresponding to the tapping. The second diver's underwater signaling device sends out a compression wave confirmation signal which the first diver's underwater signaling device receives and interprets, and then flashes a confirmation light signal visible to the first diver. The first diver's underwater signaling device sends out a first compression wave ranging signal. The second diver's underwater signaling device detects the first ranging signal and sends out a return compression wave ranging signal which the first underwater signaling device detects and determines the round-trip communication time being based on the elapsed time between the sending of the first ranging signal and the reception of the return ranging signal.

The present invention is also directed to another method of communication between two divers wearing underwater signaling devices. Each of the underwater signaling devices determines whether it is submerged by measuring the impedance across electrical leads exposed to the environment. While the two underwater signaling devices are submerged, the first diver taps a beam-interrupt button on the underwater signaling device and the underwater signaling device interprets the tapping and sends out a compression wave communication signal. The underwater signaling device receives and interprets the communication signal, and flashes a reception light signal visible to the second diver corresponding to the tapping. The second diver's underwater signaling device sends out a compression wave confirmation signal which the first diver's underwater signaling device receives and interprets, and then flashes a confirmation light signal visible to the first diver. While each underwater signaling device is not submerged, it flashes a power-level light signal indicating the level of charge of its battery.

The present invention is also directed to another method of communication between a first diver and a group of other divers wearing underwater signaling devices. The first diver taps a beam-interrupt button on his underwater signaling device and the underwater signaling device interprets the tapping and sends out a compression wave communication signal. The other underwater signaling devices receive and interpret the communication signal, and flash a reception light signal visible to the other divers corresponding to the tapping. The other diver's underwater signaling devices each send out a compression wave confirmation signal which the first diver's underwater signaling device receives and interprets, and then flashes a confirmation light signal visible to the first diver.

The present invention is also directed to another method of communication between two divers wearing underwater signaling devices. Each of the underwater signaling devices determines whether it is submerged by measuring the impedance across electrical leads exposed to the environment. While the underwater signaling devices are not submerged, a first one sends out a mating initiation signal. The first underwater signaling device sends out a channel-specification signal which specifies a channel decode for subsequent communications between the two underwater signaling devices. While both underwater signaling devices are submerged, the diver wearing a first underwater signaling device taps a beam-interrupt button on the first underwater signaling device and the underwater signaling device interprets the tapping and sends out a compression wave communication signal. The second underwater signaling device receives and interprets the communication signal, and flashes a reception light signal visible to the second diver corresponding to the tapping. The second diver's underwater signaling device sends out a compression wave confirmation signal which the first diver's underwater signaling device receives and interprets, and then flashes a confirmation light signal visible to the first diver.

The present invention is also directed to another method of communication between two pairs of divers wearing underwater signaling devices where a communication channel specific to each pair is generated and used. Each of the underwater signaling devices determines whether it is submerged by measuring the impedance across electrical leads exposed to the environment. While the first pair of underwater signaling devices is not submerged, a first one of the first pair sends out a mating initiation signal. The first of the first pair of underwater signaling devices sends out a channel-specification signal which specifies a first channel decode for subsequent communications between the first pair of underwater signaling devices. While the second pair of underwater signaling devices is not submerged, a first one of the second pair of underwater signaling devices sends out a mating initiation signal. The first of the second pair of underwater signaling devices sends out a channel-specification signal which specifies a second channel decode for subsequent communications between the second pair of underwater signaling devices. While the first pair of underwater signaling devices is submerged, a diver wearing the first one of the first pair of underwater signaling devices taps a beam-interrupt button on the underwater signaling device and the underwater signaling device interprets the tapping and sends out a compression wave communication signal over the first channel. The second of the first pair of underwater signaling devices receives and interprets the communication signal, and flashes a reception light signal visible to the second of the first pair of divers corresponding to the tapping. The second of the first pair of underwater signaling devices sends out a compression wave confirmation signal over the first channel which the first of the first pair of underwater signaling devices receives and interprets, and then flashes a confirmation light signal visible to the first of the first pair of divers. While the second pair of underwater signaling devices is submerged, a diver wearing a first one of the second pair of underwater signaling devices taps a beam-interrupt button on the underwater signaling device and the underwater signaling device interprets the tapping and sends out a compression wave communication signal over the second channel. The second of the second pair of underwater signaling devices receives and interprets the communication signal, and flashes a reception light signal visible to the second of the second pair of divers corresponding to the tapping. The second of the second pair of underwater signaling devices sends out a compression wave confirmation signal over the second channel which the first of the second pair of underwater signaling devices receives and interprets, and then flashes a confirmation light signal visible to the first of the second pair of divers.

The present invention is also directed to a method of communication between two transceivers where each of the transceivers listens for communication signals from the other during periodic detection windows having a length of P bits. When a transceiver does not detect a communication signal during a detection window, it listens for a communication signal in the next detection window. The communication signals are an initial N-bit length code followed by a gap followed by a repetition of the initial N-bit length code, where N is greater than P. The beginnings of the detection windows are separated by less than the transmission time for N bits. When a transceiver detects a communication signal during one of the detection windows, it receives a subsequent portion of the communication signal during a reception window having a length at least as long as the length of the gap plus the transmission time for N bits.

The present invention is also directed to a method for ascertaining whether a signal at a specific frequency is received. Received input is digitized to a first constant value if the received input is positive and to a negative of the constant value if the received input is negative to provide digitized samples. The digitized samples are multiplied with values of a sine wave of the specific frequency at corresponding times to provide intermediate sine products, and the intermediate sine products are summed to provide a sine correlation. The digitized samples are also multiplied with values of a cosine wave of the specific frequency at corresponding times to provide intermediate cosine products, and the intermediate cosine products are summed to provide a cosine correlation. The cosine correlation and the sine correlation are combined and compared to a threshold value.

The present invention is also directed to a method for maintaining the focusing properties in underwater use of a light source or detector having an air-environment lens. The lens of the light source or detector is enclosed in an environment with an index of refraction near unity within a transparent container, the transparent container having non-focusing surfaces through which light from the light source or detector passes. Then the transparent container is encased in a transparent plastic to prevent liquid leakage into the container.

BRIEF DESCRIPTION OF THE DRAWINGS

The accompanying figures, which are incorporated in and form a part of the present specification, illustrate embodiments of the invention and, together with the description given above and the detailed description of the preferred embodiments given below, serve to explain the principles of the invention.

DETAILED DESCRIPTION OF THE PREFERRED EMBODIMENT AND PROCESS

Figure 1A:
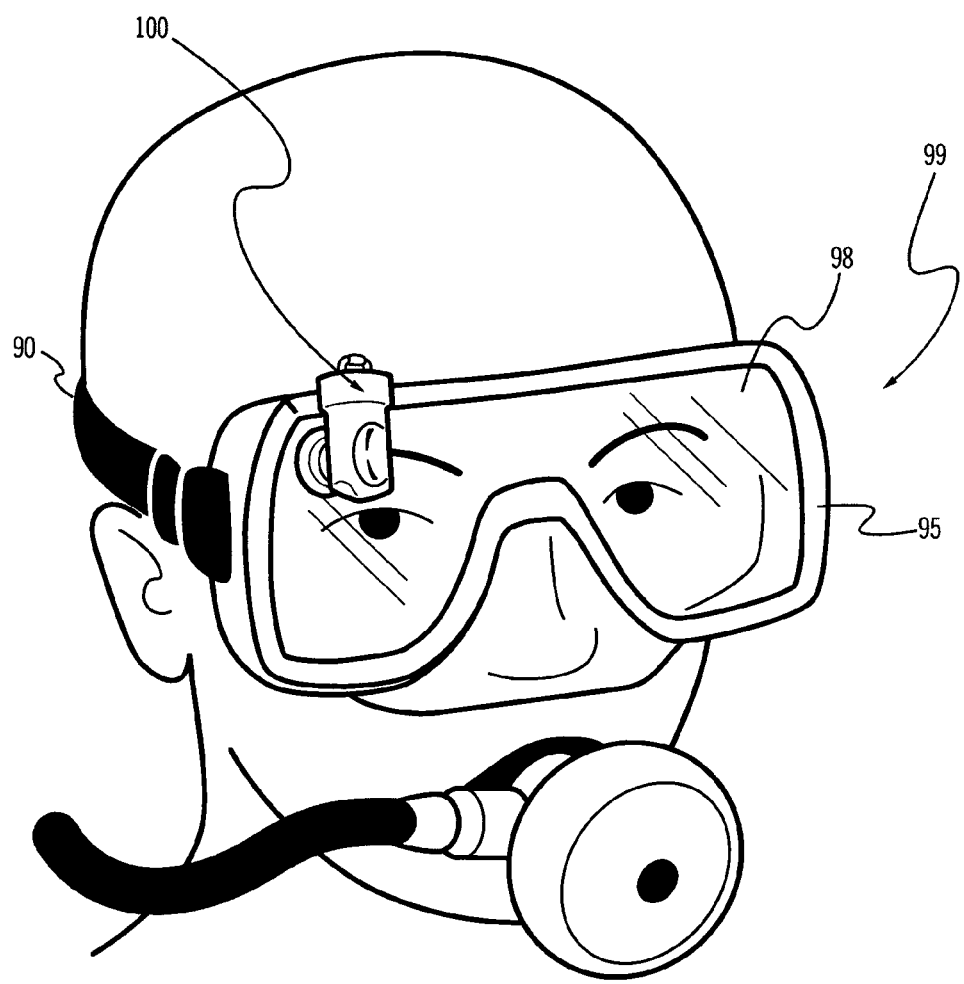
FIG. 1A shows the device of the present invention attached to a diver's mask.
Figure 1B:
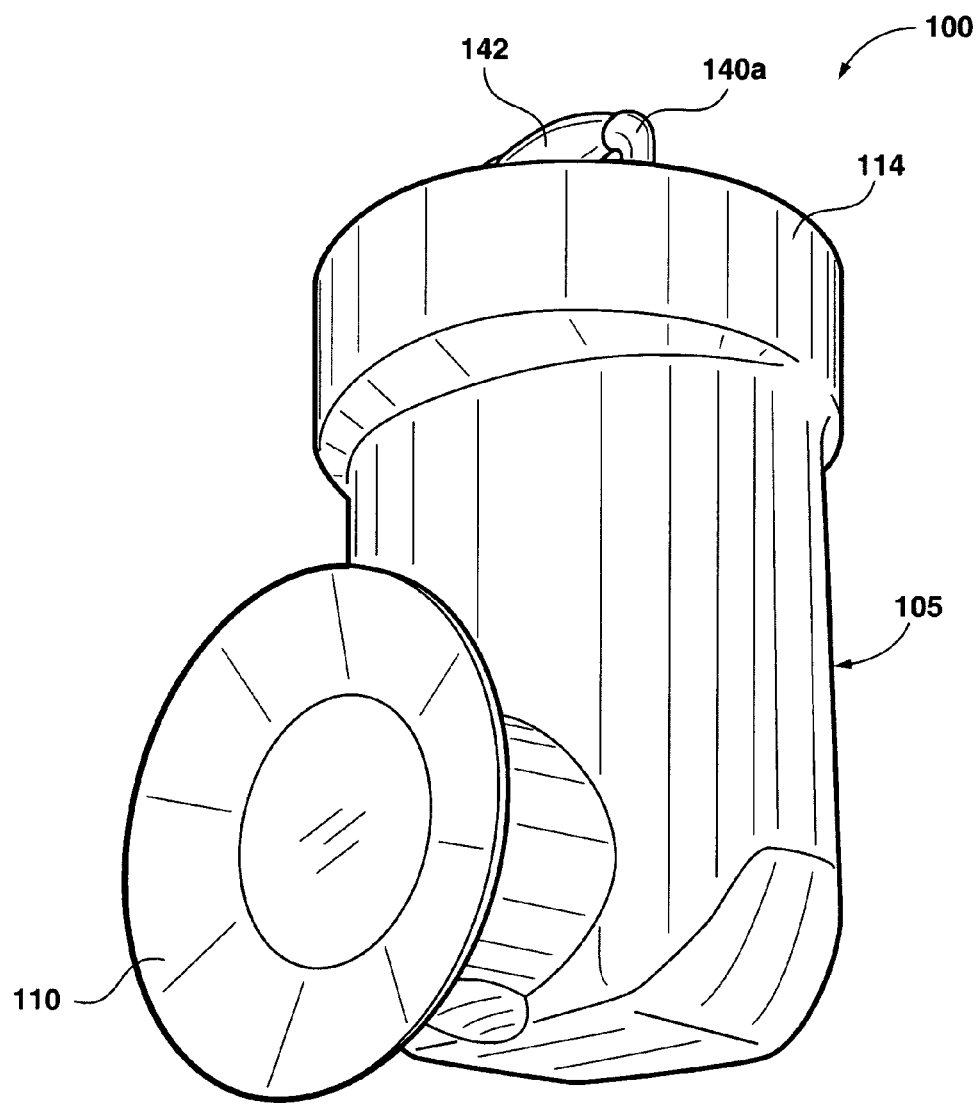
FIG. 1B is a close-up view of the device.
Figure 1C:
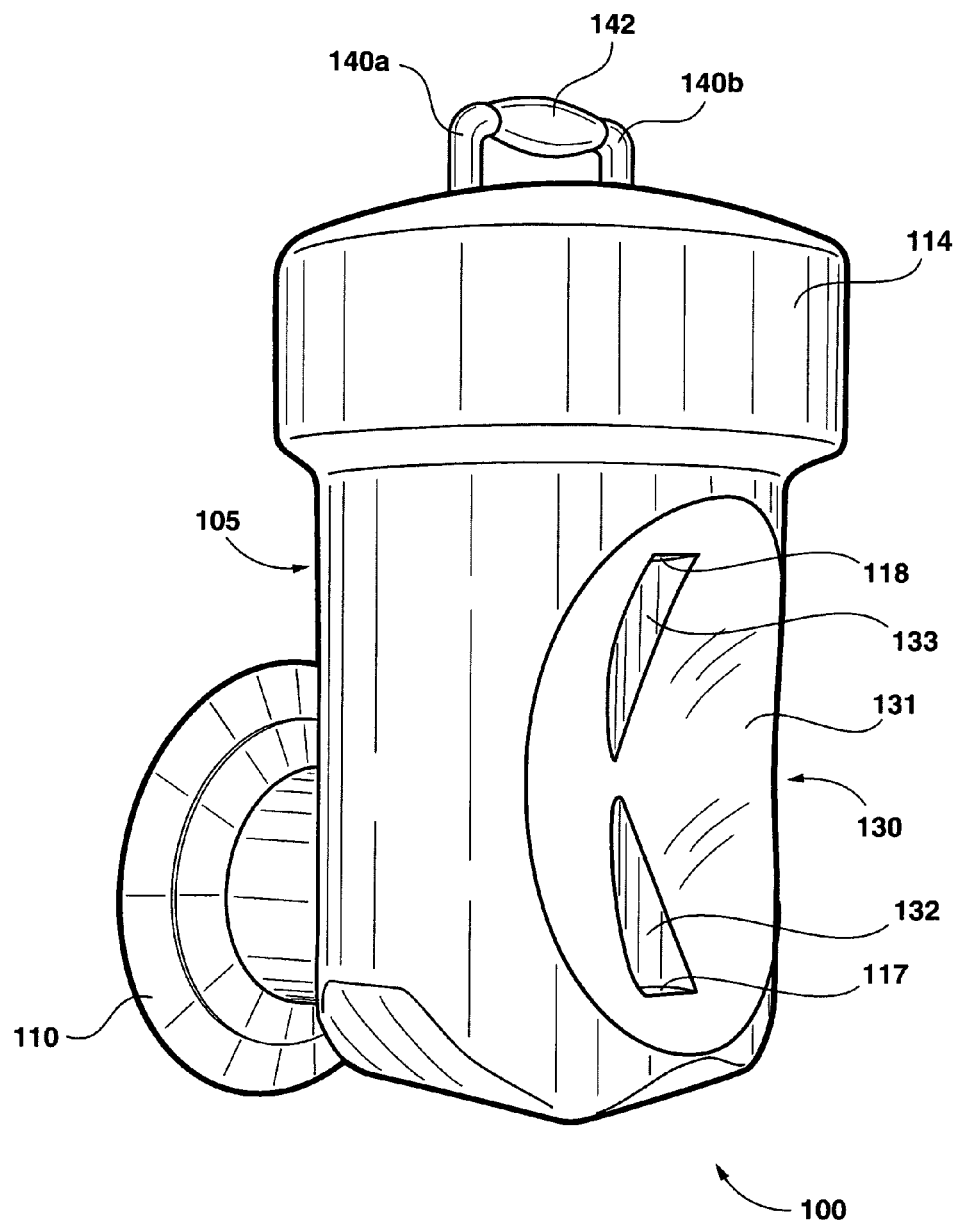
FIG. 1C is another close-up view of the device.

The apparatus of the present invention is an underwater inter-diver signaling device 100 which mounts on the glass 98 of a diver's diving mask 99 as shown in FIG. 1A. Preferably, the device 100 is mounted on an upper corner of the glass 98 with the bulk of the chassis 105 of the device 100 extending beyond the range of vision provided by the diving mask 99, so that the light from the LEDs 230 will be visible but the device 100 minimally obscures the diver's vision. The preferred embodiment of the outer contours of the device 100 and placement of the main internal physical components within the device 100 are shown in FIGS. 1B and 1C. The device 100 consists of a main chassis 105, a suction cup 110 extending from one side of the chassis 105, a beam-interrupt button 130 built into the other side of the chassis 105, and a toroidal ultrasonic transducer 115 (not visible in FIGS. 1A, 1B and 1C) within a roughly disk-shaped collar 114 at the top of the chassis 105. The device 100 is light weight, and roughly thumb size. The suction cup 110 is clear, and centered behind the suction cup 110 is a bank of LEDs 230 (except blue LED D5 which is located elsewhere as described below) not visible in FIGS. 1B and 1C, but shown in the circuit diagram of FIGS. 2A and 2B. (Alternatively, the suction cup 110 can be removed and a light pipe may be inserted into the suction cup's socket, so that the chassis 105 may be mounted away from the mask 99, and light from the LEDs 230 may be channeled to the glass 98 of the mask 99 or somewhere else easily viewed. This provides the advantage of obscuring a smaller portion of the diver's view.) The blue LED D5 is located at the top of the device 100, under the I/O leads 140 near the center of the transducer 115. The capacitor in parallel with the LED D5 acts as a voltage doubler, increasing the brightness of the LED D5. The LED D5 flashes every three seconds to facilitate visual contact between divers.

The device 100 has roughly neutral buoyancy and is easily attached to the "glass" of any diver's diving mask 99 with the suction cup. The region below the collar 114 is indented relative to the suction cup 100 providing room for the rim 95 of a diver's mask 99. When attachment of the device 100 to the diver's mask 99 is made above water, the water pressure against the suction cup 110 when submerged provides a firm attachment. (For additional security a lanyard may be used to tether the device 100 to the strap 90 of the diver's mask 99.) The front and rear surfaces of the suction cup 110 are flat, and therefore non-focusing, so that the light from the LEDs 230 has a wide, even distribution and is visible to the diver. The suction cup 110 is affixed to the chassis 105 of the device via a friction fit of a bulbous nib (not visible in the figures) extending out of the apex of the cup 110 into a similarly-shaped cavity (not visible in the figures) in the chassis 105, so that the suction cup 110 can be replaced if the rubber from which it is made loses its elasticity or strength.

From the top of the chassis 105 extends two non-corrodible L-shaped input/output (I/O) leads 140a and 140b which have a number of functions. By monitoring the impedance between the I/O leads 140a and 140b (collectively referred to with reference numeral 140), a processor (not shown in FIGS. 1B and 1C) inside the device 100 detects whether the device is wetted by fresh water, wetted by salt water, or not wetted by water. Typically, the wetting or non-wetting will by produced by submerging or not submerging the device 100, and will be referred to in the present specification as such. The device 100 has different modes of operation when submerged and when not submerged in water, as will be described below. The I/O leads 140 are also used to transfer information to the processor (for instance, for updating, upgrading, modifying, or debugging the software), and to access data from a processor 210 (shown in FIGS. 2A and 2B, and also referred to in the present specification as the CPU 210). The I/O leads 140 are also used to charge the battery by applying a voltage above a threshold level (which in the preferred embodiment is 3.95 Volts) to the I/O leads 140. The gap between the ends of the I/O leads 140 is spanned with a bead 142 of non-conducting plastic, and the above-mentioned lanyard can be strung through the loop formed by the I/O leads 140, bead 142 and chassis 105.

The beam-interrupt button 130 has no moving parts, and all the internal components, except exterior portions of the I/O leads 140, are completely and permanently sealed inside the translucent (i.e., non-opaque) plastic of the chassis 105 by molding the plastic around the components so they are completely encased and there is no danger of water leakage into the circuitry. (By "permanently" sealed it is meant that the components cannot be freed or physically accessed without breaking the plastic. Furthermore, according to the lexography of the present specification, to be "completely, permanently encased" in plastic means to be completely and permanently sealed inside plastic as described above.) The button 130 can be easily "pushed" using a gloved finger or an ungloved finger. The beam-interrupt button 130 has a roughly ellipsoidal-section concave tap basin 131 on the side of the device 100 opposite the suction cup 110, with a first cylindrical bore 132 extending from the center and parallel to the major axis of the ellipsoid, and a second cylindrical bore 133 extending from the center in the opposite direction to the first cylindrical bore 132. At the end of the first cylindrical bore 132 is a light detector 117 and at the end of the second cylindrical bore 133 is a light emitter 118, and interruptions of the beam from the emitter 118 to the detector 117 are detected by the processor 210.

Figure 1D:
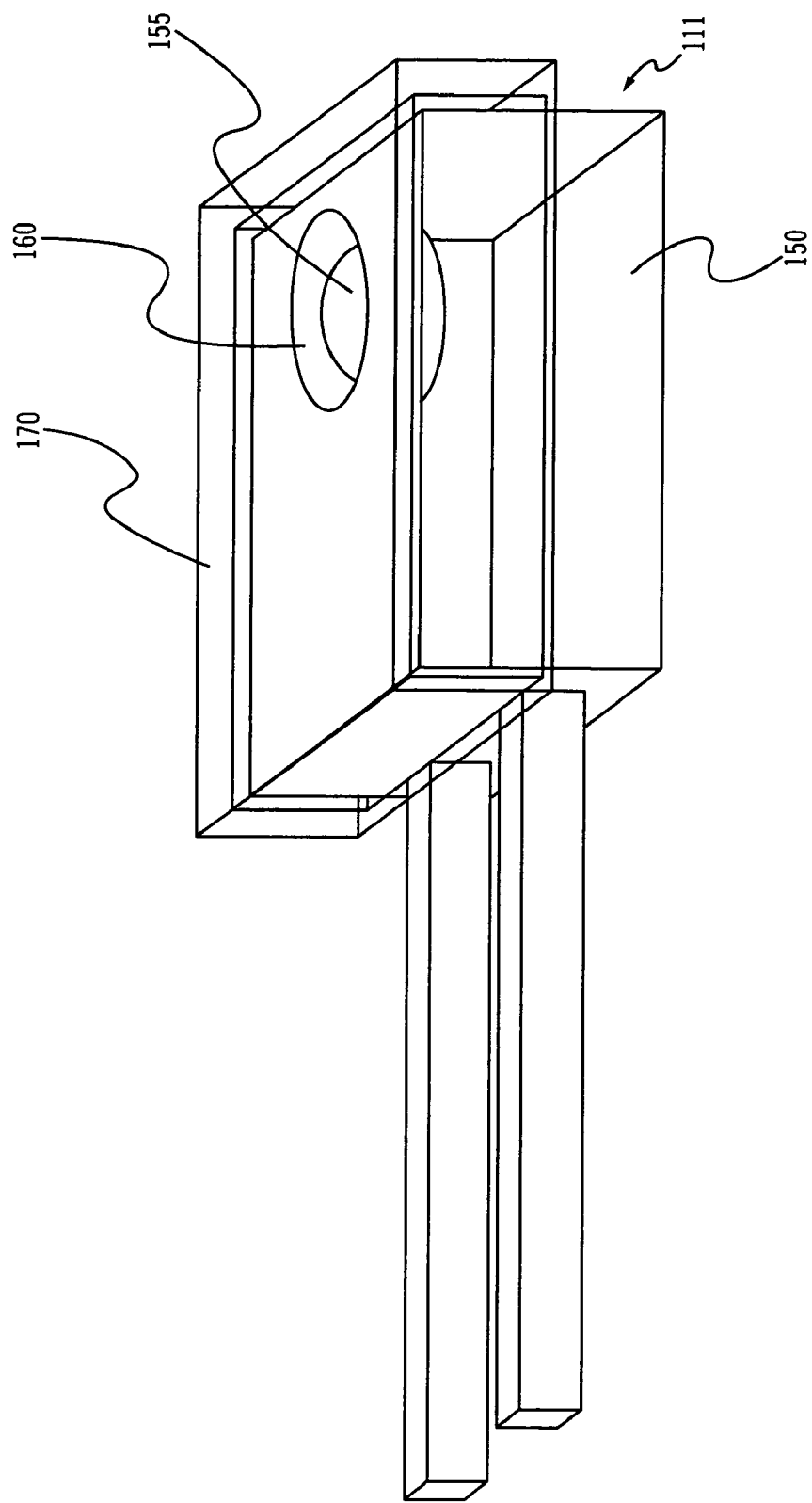
FIG. 1D is a close-up view of the light detector of the beam-interrupt button.

The emitter 118 is an infra-red LED and the detector 117 is a photo-transistor which detects infra-red radiation. Using the infra-red portion of the spectrum for the beam of the beam-interrupt button 130 provides the advantages that (i) photo-transistors for sensing infra-red are inexpensive, reliable and readily available, and (ii) infra-red radiation from sunlight is quickly absorbed by water so that the amount of ambient infra-red radiation decreases quickly with the depth of the dive, facilitating detection of the beam from the emitter 118. As can be seen from the perspective view of the infra-red detector 117 shown in FIG. 1D, to preserve the functioning of the lens as a lens when underwater an air cavity 160 with a flat boundary normal to the axis between the emitter 118 and detector 117 is formed by a cover 170 over the lens 155 of the LED. (For the purposes of the present specification, "air" may be a vacuum or any gas which has an index of refraction close to that of air, and an "air environment" is an environment with an index of refraction close to that of air, i.e., close to unity. Furthermore, boundary surfaces are considered to be "non-focusing" when light through said boundaries is not focused on the length scale of the path of the light within the device.) The cover 170 is friction fitted over the chassis 150 of the detector 117, and the assembly 170/150 is dipped in urethane, preferably the same urethane used for the chassis 105 of the device 100, and allowed to set in a rubber mold to insure a flat top surface. Sealing the assembly 170/150 in urethane insures that no urethane leaks under the cover 170 when molded inside the chassis 105 of the device. The sides of the detector 117 are opaqued via dark paint to prevent ambient light from the sides reaching the lens 155. (An air cavity is formed around the lens of the emitter 118 in the same manner and for the same purpose as for the detector 117.)

At the top end (according to the orientations shown in FIGS. 1B and 1C) of the device 100 is a roughly disk-shaped collar 114 within which is a ring-shaped transducer 115 made of a lead-zirconium-titanate ceramic (not visible in FIGS. 1A, 1B and 1C). The transducer 115 is driven by the processor 210 to expand and contract radially at an ultrasonic frequency in the neighborhood of 57 kHz to generate toroidal compression waves which another device 100 according to the present invention can detect. As the toroidal compression waves expand outwards they increasingly approximate a spherical wave (except a narrow zero remains at the poles), and the power per unit area of the waves falls off as $1/r^2$. To maximize the efficiency of the transducer 115, the plastic is selected to have an acoustic impedance halfway between that of water and that of the ceramic. If the plastic is too stiff, the transducer 115 cannot perform its radial oscillations. If the plastic is too soft, the ultrasonic waves are absorbed by the plastic. In the preferred embodiment, the plastic has a Shore hardness of between D40 and D70, more preferably between D50 and D60, and still more preferably roughly D55. The transmissions are binary frequency-shift keying modulated, since frequency-shift keying (as opposed to phase-shift keying) is relatively insensitive to the phase shifts which result from transmissions through air bubbles. (Binary frequency-shift keying modulation is also called binary frequency-shift keying encoding or binary frequency-shift keying in the literature, but the term modulation is used in this context in the present specification to clearly differentiate from the channelization processes that are referred to as encoding in the present specification.)

It should be noted that although there is a zero in the emissions of the transducer 115 along the axis of circular symmetry of the transducer 115, the transmission is essentially omni-directional since the likelihood of two devices being aligned such that one is sufficiently near the zero of reception or transmission of the other to hinder communication is low given the sensitivity in reception of the devices 100 of the present invention. The frequency of the transmissions, which are in the neighborhood of 57 kHz, is chosen to be high enough that (i) it is above that of most underwater background noise and (ii) does not require an overly large transducer 115 (since the size of the transducer needed varies inversely with frequency), yet not so high that distance-attenuation, which increases with frequency, overly limits the communication range of devices 100.

All the internal components of the device 100 (i.e., any precasting support structures (not shown), the transducer 115, the infra-red emitter 118, the infra-red detector 117, and the circuitry 200, including the processor 210, the LEDs 230, battery 280, and all internal wiring) except the exposed parts of the I/O leads 140 are completely encapsulated in transparent plastic. (The circuitry is referred to collectively, generically or in part with reference numeral 200.) This is accomplished by using the I/O leads 140 to position the device in the mold, and then forming plastic around the internal components 115, 118, 117, 210, 230, 280, etc. This insures that there is no risk of "waterproof" seals rupturing—the device 100 of the present invention is waterproof well beyond the depths which scuba divers can go. Because the battery 280 would be destroyed by the heat and temperature required for injection molding, the plastic of the chassis 105 is formed by a chemical reaction.

Figure 2A:
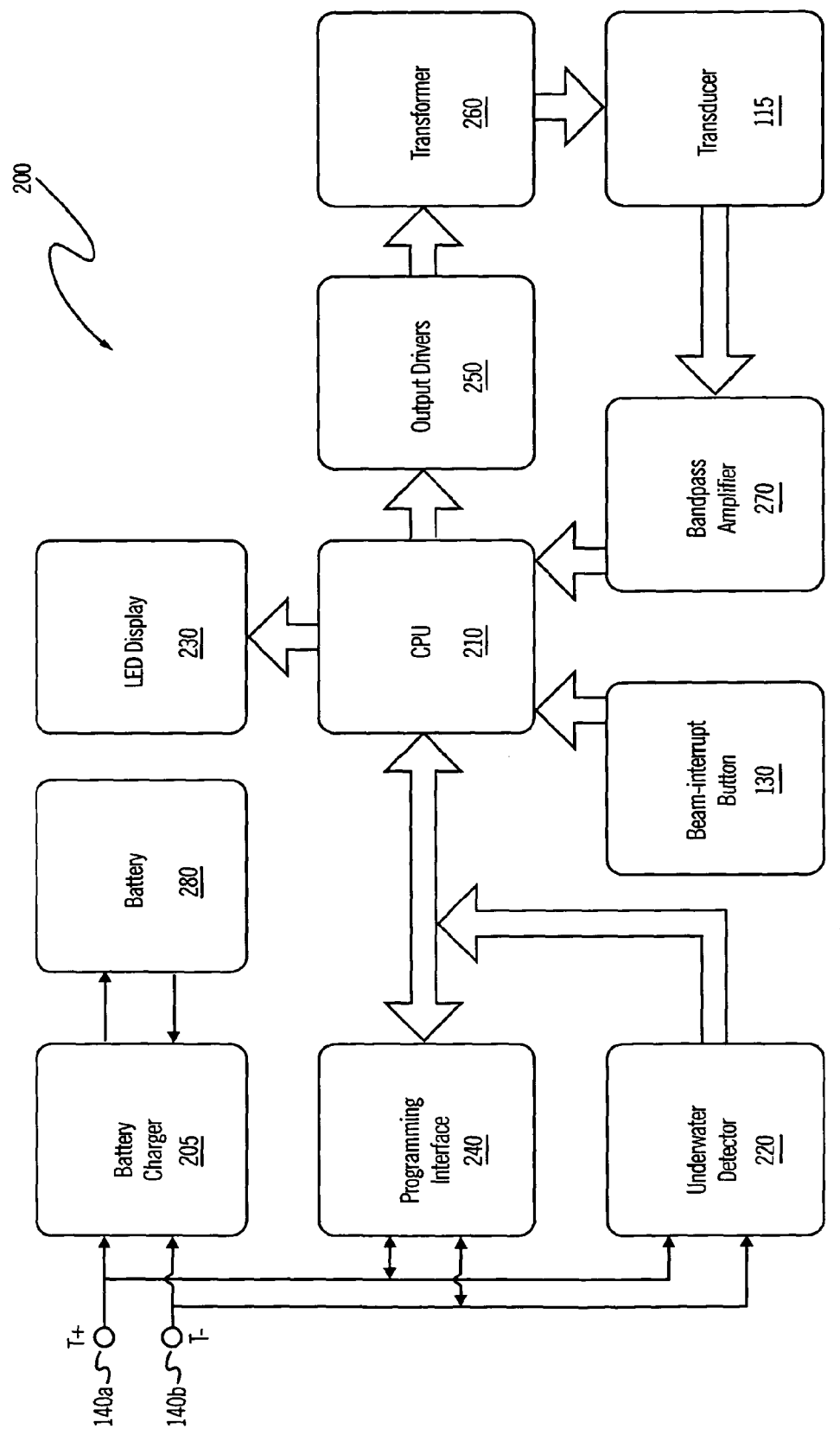
FIG. 2A is a block diagram of the internal components of the device of the present invention.
Figure 2B:
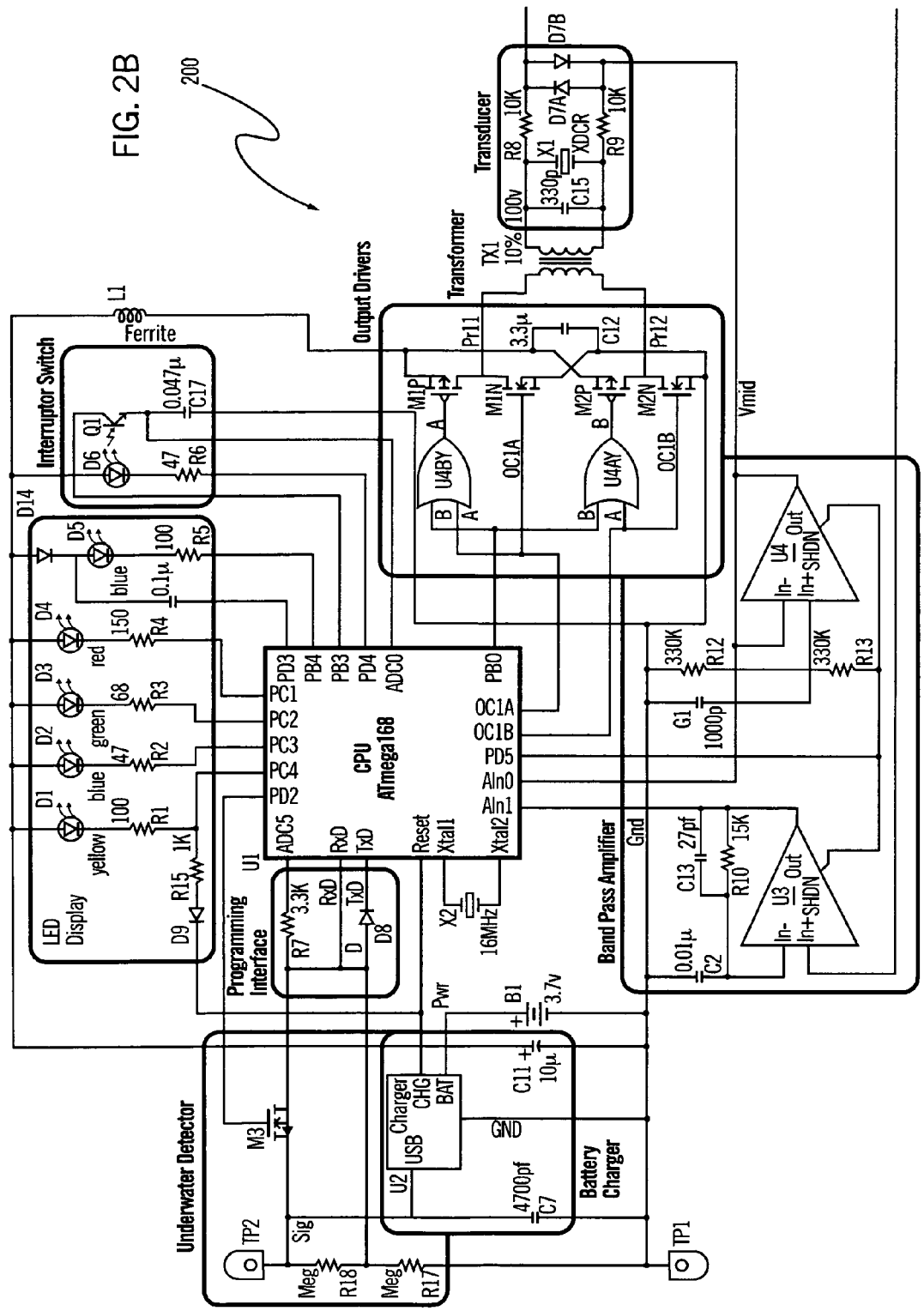
FIG. 2B is a circuit diagram for the device of the present invention.

A block diagram for the circuitry 200 of the device 100 is shown in FIG. 2A. The actual circuit diagram of the circuitry 200 with the components of the block diagram superimposed, but the interconnections of FIG. 2A omitted, is shown in FIG. 2B. (For clarity of presentation, bypass capacitors are also omitted from the circuitry 200 of FIG. 2B.) As shown in FIGS. 2A and 2B, the I/O leads 140 are connected to (i) a battery charger 205 so as to allow the charger 205 to charge the battery 280, (ii) a programming interface 240 so as to allow the CPU 210 to be programmed, and (iii) an underwater detector 220 so as to allow the device 100 to determine whether it is underwater or not. The CPU 210 also receives input from the beam-interrupt button 130, and signals $\phi(t)$ received by the transducer 115 are sent via a band-pass amplifier 270 to the CPU 210. Timing is controlled by a 16 MHz crystal (shown in FIG. 2B), providing an accuracy with other devices 100 of thirty parts per million. The CPU 210 controls the LED display 230 and the output drivers 250. The output drivers 250 power the transducer 115 via the transformer 260 which increases the signal voltage from 4 V to 80 V. The modulation of outgoing signals $\phi_o(t)$ and the demodulation of incoming signals $\phi_i(t)$ is performed by software loaded into the CPU 210, rather than in hardware, allowing the functioning of the device 100 to be easily upgraded, updated, customized, or otherwise modified.

Description of the Functions and Operation

A first diver wearing a first device 100 according to the present invention communicates to a second diver wearing a second device 100 according to the present invention by tapping the tap basin 131, thereby interrupting the light beam from the infra-red emitter 118 to the infra-red detector 117. The processor 210 in the first device 100 ascertains that the light beam has been interrupted, and sends a signal to the transducer 115 to cause it to rapidly expand and contract, sending an ultrasonic compression-wave signal $\phi_o(t)$ corresponding to what was tapped on the tap basin 117 through the water. (It should be understood that the ultrasonic compression-wave signal $\phi_o(t)$ "corresponds" to what was tapped in that there is a mapping between what was tapped and the ultrasonic compression-wave signal $\phi_o(t)$.) If the second device 100 is within range and using the same decode (i.e., communicating over the same decode communication channel), the transducer 115 in the second device 100 receives the compression waves $\phi_i(t)$, the processor 210 in the second device 100 processes the compression waves to determine the communication tapped by the first diver, and the processor 210 in the second device 100 causes the colored LEDs 230 behind the second diver's suction cup 110 to flash according to predetermined criteria, as well as an audible signal to be emitted. (It should be noted that according to the lexography of the present specification, the "flashing" of a light or lights is a change of state of any sort, such as a change in color, brightness, turning on or off, or a change in the rate of blinking.) Upon receiving a signal from the first device 100, the second device 100 sends a reception-confirmation signal back to the first device 100. When the first device 100 receives the reception-confirmation signal, its processor 210 flashes the colored LEDs 230 behind the first diver's suction cup 110 in a transmission-received pattern. (Transmissions initiated by the second diver for reception by the first diver work in the same manner as described above with "first" substituted for "second.")

Also, a group of more than two divers wearing the devices 100 may communicate with each other according to the present invention. A first diver wearing a first device 100 may communicate to the other divers in the group by tapping the tap basin 131, interrupting the light beam from the infra-red emitter 118 to the infra-red detector 117. The processor 210 in the first device 100 determines that the light beam has been interrupted, and sends a signal to the transducer 115 to cause it to send ultrasonic compression waves through the water. When the transducers 115 in the devices 100 of the other divers receive the compression waves, their processors 210 process the received signal to determine the signal tapped by the first diver, and cause the colored LEDs 230 behind the divers' suction cups 110 to flash according to predetermined criteria, as well as an audible signal to be emitted. Upon receiving a signal from the first device 100, the devices 100 of the other divers send reception-confirmation signals back to the first device 100. When the first device 100 receives the reception-confirmation signal, its processor 210 flashes the colored LEDs 230 behind the first diver's suction cup 110 in a transmission-received pattern which reflects if all, some, or none of the other divers received the initial transmission. Alternatively, the colored LEDs 230 behind the first diver's suction cup 110 may flash in a transmission-received pattern which reflects the number of other divers which received the initial transmission. In the preferred embodiment, when only two divers are in communication (i.e., "coupled") using the device of the present invention, the green LED 230 flashes when the first device 100 receives the reception-confirmation signal from the second device, and the red LED 230 flashes if the first device does not receive the reception-confirmation signal within a time equal to approximately twice the maximum communication distance divided by the speed of sound in water.

According to the preferred embodiment of the present invention, the transducer 115 can also be used to produce an audible output by parametric downmixing. The parametric downmixing is accomplished by sending out two ultrasonic tones within the characteristic ringing time of the electromechanical transducer 115, causing sum and difference frequencies to be produced by mechanical non-linearities in the transducer 115 or the device 100 as a whole. For instance, a 56 kHZ tone followed directly by a 57 kHz tone produces a 1 kHz tone, and a 56 kHZ tone followed directly by a 58 kHz tone produces a 2 kHz tone. This audible signal is used as an indicator, along with the blinking LEDs 230, of signal reception, low battery condition, buddy out of range, emergencies, etc.

Alternatively, the signals transmitted by the transducer 115 can be used to produce an audible or tactile output by modulating a high-frequency ultrasonic signal. In the preferred embodiment the signal is modulated by a "chirp" envelope, producing a sensation which is at the border between audible and tactile and is detectable both audibly and tactilely. This audible signal can be used as an indicator, along with the blinking LEDs 230, of signal reception, low battery condition, buddy out of range, emergencies, etc.

The processor 210 differentiates between a long tap, i.e., one where the finger stays in contact with the tap basin 131 for over roughly three seconds, and shorter taps. The functioning in response to taps on the beam-interrupt button 130 is different if the devices are underwater and therefore actively performing inter-diver communications, or above water and therefore in the process of being programmed or mated. When underwater, the meanings assigned to the number of taps used in communications is at the discretion of divers. One of the most useful functions of the signaling device 100 is to allow a diver to request that a "buddy" diver makes visual contact with him or her, so that would typically be the meaning assigned to a one-tap signal or a two-tap signal.

When underwater, the devices 100 exchange synchronization/ranging "pings" at regular intervals of once every sixty seconds. The time for a ping to travel from one device to another and back again is measured and, given the known speed of sound in water, the distance between the devices 100 is determined. Alternatively, the distance between the devices 100 is determined by monitoring the intensity of compression wave communication signals. To help divers avoid straying beyond the communication range with each other, the devices 100 indicate their separation distance by a color-coded regular-flashing of the LEDs 230 when appropriate. If the divers are well within range of each other, the green LED 230 flashes at roughly 5 second intervals. If the separation between divers begins to approach the limits of the communication range, the yellow LED 230 flashes at roughly two-second intervals. And if the divers are out of range of each other or in imminent danger of going out of range of each other, the red LED 230 flashes roughly three times per second.

The brightness of the LEDs 230 is adjusted to decrease as the amount of ambient light decreases by monitoring the amount of background light detected by the beam-interrupt button's infra-red detector 117 (which also provides output to some extent for visible light) when the infra-red emitter 118 is not on, and adjusting the brightness of the LEDs 230 via pulse-width modulation. Ambient light decreases considerably with the depth of a dive, and there is a considerable difference in amount of ambient light between day dives and night or cave dives. Adjusting the brightness of the LEDs 230 based on the amount of ambient light prevents the LEDs 230 from producing temporary blind spots in the diver's vision.

The LEDs 230 are also used to indicate the battery level directly after the device 100 is powered up. When the device 100 is not submerged, the battery level can also be ascertained by "pressing" the beam-interrupt button 130 for three seconds. The LEDs 230 also indicate battery level by flashing every three seconds when the device 100 has gone into its battery-conserving low-power mode when above water and not in use. A flashing blue LED 230 indicates the battery 280 is fully charged and the device 100 can be used for roughly twenty-five dives. A flashing green LED 230 indicates the battery 280 is charged to a level sufficient for the device 100 to be used for multiple dives. A flashing yellow LED 230 indicates the battery 280 is charged to a level sufficient for the device 100 to be used for a single dive. A flashing red LED 230 indicates the battery 280 needs to be recharged before the device is used. The charge level of the battery 280 is monitored by comparing the battery voltage to the electronic band gap of silicon, which is 1.2 V.

The devices 100 are optimized for low power usage in a number of ways, allowing a device 100 to be used for roughly twenty-five dives before needing recharging. When not submerged the devices 100 enter a low-power mode where the battery-level indicator light flashes once every three seconds. When underwater, the major source of power usage is in producing transmissions.

Communications according to the present invention use Golay codes having a length of 23 bits, of which 12 bits are carriers of information (i.e., there is a 12-bit "payload") and the remaining 11 bits are error detection and correction bits. These Golay codes can detect up to 6 errors or can correct up to 3 errors. A tutorial on Golay codes can be found in Kanemasu, M., "Golay Codes," pp. 95-99, MIT Undergraduate Journal of Mathematics, MIT Press, 1990, which is incorporated herein by reference. According to the preferred embodiment of the present invention, nine bits of the payload is a "decode" specifying the communication channel, and the other three bits are an "operation code" used for transmitting information or specifying instructions.

The processor 210 in each device 100 is initialized at the factory with a decode. There are $2^9$=512 different nine-bit decodes, so the likelihood of two randomly chosen devices having the same decode is small. In order to communicate, a device 100 must know the decode its partner device or devices 100 are transmitting. According to the present invention, two communicating devices 100 are put through a "mating" process which sets them to use the same decode. To couple two devices 100, they are brought to within a foot or so of each other while above water, and the beam-interrupt button 130 of one of the devices 100 is tapped four times to induce the processor 210 to send out a mating signal. (The tapping sequence used to initiate mating should be one which is relatively easy to do intentionally but rarely occurs unintentionally. For instance, in an alternate embodiment the initiation of mating is accomplished by holding down the beam-interrupt button 130 causing an acknowledgement LED 230 to light, waiting until the LED 230 goes off after three seconds, and then tapping the beam-interrupt button 130 again within one second.) When the other device 100 detects a mating signal, it 100 signals its reception and then the first device 100 sends the decode which will be used in communications between the two devices 100. It is also possible to couple more than two devices 100 using the same process. All the devices 100 are brought within a foot or so of each other while above water, and a quadruple tap on one of the devices 100 causes it to send out a mating signal which the other devices 100 in the vicinity will then use as the decode, and confirm their reception by sending back confirmation signals. When a device 100 is triggered to initiate the process, the decode which it transmits is the decode which it was assigned at the production factory. Therefore, triggering a device 100 will generally decouple it 100 from any devices 100 it had been coupled to previously. If two or more devices 100 in a first group are to be coupled and the factory preset decode of a first one of the devices 100 in the first group inadvertently couples it to another nearby group of devices 100 which the first group were not intended to be coupled with (this has a relatively small chance of happening because there are 512 different decodes), then a second of the devices 100 in the first group may be used to initiate the mating (since the odds are very small the second device 100 in the first group will have the same factory preset decode as the first device 100 in the first group).

The mating can be reversed in a device 100 by separating it by at least several feet from other devices 100 and again tapping the beam-interrupt button 130 four times. This is useful when the factory preset decode of that device 100 is to be used as the group decode when there was a coincidence in decodes between groups of devices 100 that are intended to be in the proximity of each other during a dive but not intended to be in communication.

Figure 3:
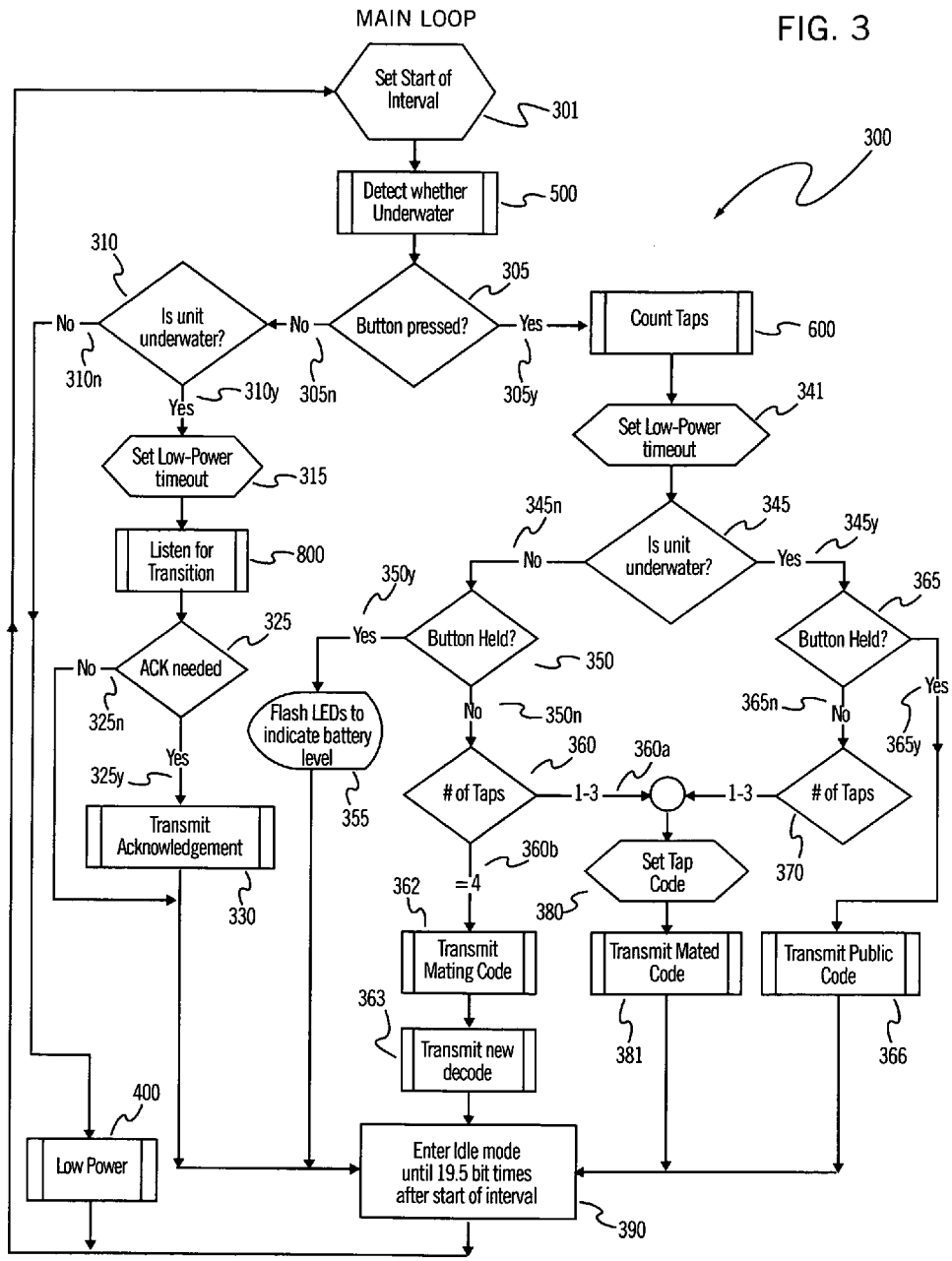
FIG. 3 is the main-loop flow chart for the process by which the device operates.

The above-described functions are implemented by the CPU 210 using the main loop flowchart 300 of FIG. 3. Each loop of the main loop 300 begins by setting the start of a time interval 301. The device 100 then detects 500 whether the I/O leads are wetted (which is generally when it is underwater, and will be referred to in the present specification as being "submerged") by measuring the resistance across the I/O leads 140, as discussed in more detail below in conjunction with FIG. 5. Then it is determined 305 whether the beam-interrupt button 130 is currently pressed. If the beam-interrupt button 130 is pressed 305y, then a count-taps function 600 is implemented, as discussed in more detail below in conjunction with FIG. 6. A low-power timeout is then initiated 341, i.e., the low-power mode of operation is terminated for a timeout interval, and the determination 500 made above as to whether the device 100 is underwater is consulted 345. If the device 100 is 345y underwater, then it is determined 365 whether the beam-interrupt button 130 is being held down (i.e., if there is an extended-period "depression" of the button 130) or tapped (i.e., if there is a short-period "depression" of the button 130). If the button 130 is 365y being held down, then the public code, i.e., a code on a channel receivable by all devices 100, is transmitted 366. The public code may be transmitted multiple times or continually. (The transmission process is discussed in detail below in conjunction with FIG. 12.) If the button 130 is not 365n being held down, then the number of taps on the button 130 is tallied 370, a tap code is generated 380, and the tap code is transmitted 381. The "tap code" is the Golay code which incorporates the appropriate decode and an operation code representing the tap sequence detected to have been performed on the button 130.

However, if at step 345 it is determined that the device 100 is not 345n underwater, then it is determined 350 whether the beam-interrupt button 130 is being held down (versus being tapped). If the button 130 is 350y being held down, then the LEDs 230 are flashed 355 to indicate the battery level as described above. However, if the button 130 is not 350n being held down, i.e., it is being tapped, then the number of taps on the button 130 is tallied 360. If the number of taps is between one and three 360a, then the tap code is set 380 and transmitted 381. If the number of taps is four 360b, then a mating-initiating code is transmitted 362 so that a neighboring device 100 may mate to it. Following that 362, a transmission incorporating the decode for that device 100 is transmitted 363, and the device 100 enters 390 an idle mode for a length of 19.5 bit times, before returning to the top 301 of the main loop 300.

If at step 305 it is determined that the beam-interrupt button 130 is not 305n pressed, then the determination 500 made above as to whether the device 100 is underwater is consulted 310. If the device 100 is not 310n underwater, then the device 100 enters a low-power mode of operation 400 and returns to the top 301 of the main loop 300. If the device 100 is 310y underwater, then the low-power timeout is set 315 (i.e., the entry into the low-power mode of operation is delayed for a time-out interval) and a transmission is listened for 800, as is described below in conjunction with FIG. 8. It is next determined 325 whether an acknowledgement is required because a transmission has been received. If an acknowledgement is 325y required, then the acknowledgement is transmitted 330, otherwise 325n no acknowledgement is sent. The device 100 then enters 390 an idle mode for a length of 19.5 bit times, before returning to the top 301 of the main loop 300.

Figure 4:
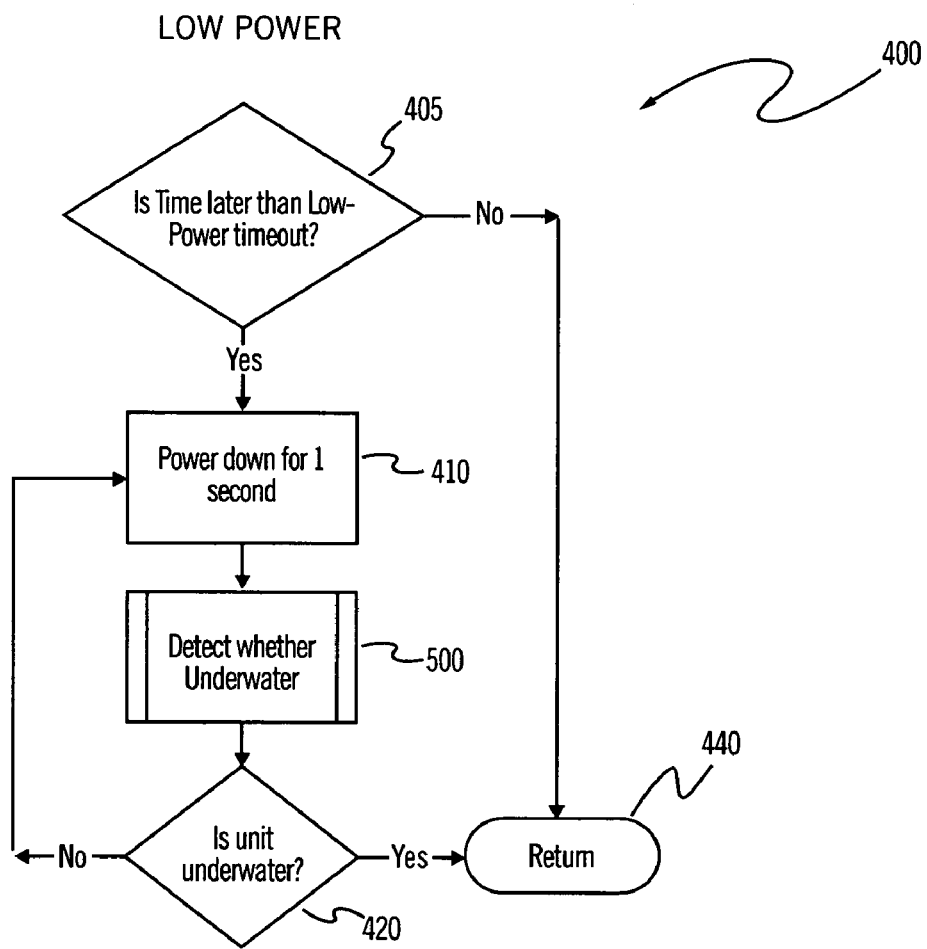
FIG. 4 is the flow chart for low-power timeouts.

The process 400 for the low-power mode of operation is shown in the flowchart 400 of FIG. 4. The process 400 begins by determining 405 whether the current time is later than the end of the current low-power timeout. (During a low-power timeout the device 100 is in a normal power usage mode of operation.) If it is not 405n, then the process 400 returns 440. However, if the current time is 405y later than the end of the current low-power timeout, then the device 100 is powered down 410 for an additional one second, and the underwater detection operation 500 is performed. The result of the underwater detection 500 is then queried 420 as to whether the device 100 is underwater, and if the device is not 420n underwater, then the process flow returns to the step of powering down of an additional second 410. However, if the device 100 is 420y underwater, then the process 400 returns 440. It should be noted that there is no monitoring of the beam-interrupt button 130 in the low-power mode. (The device 100 must first detect that it is underwater—or at least that there is some water coating the I/O leads 140 and spanning the bead 142 between the I/O leads 140s, which can be accomplished above water if desired-before the beam-interrupt button 130 is monitored.)

Figure 5:
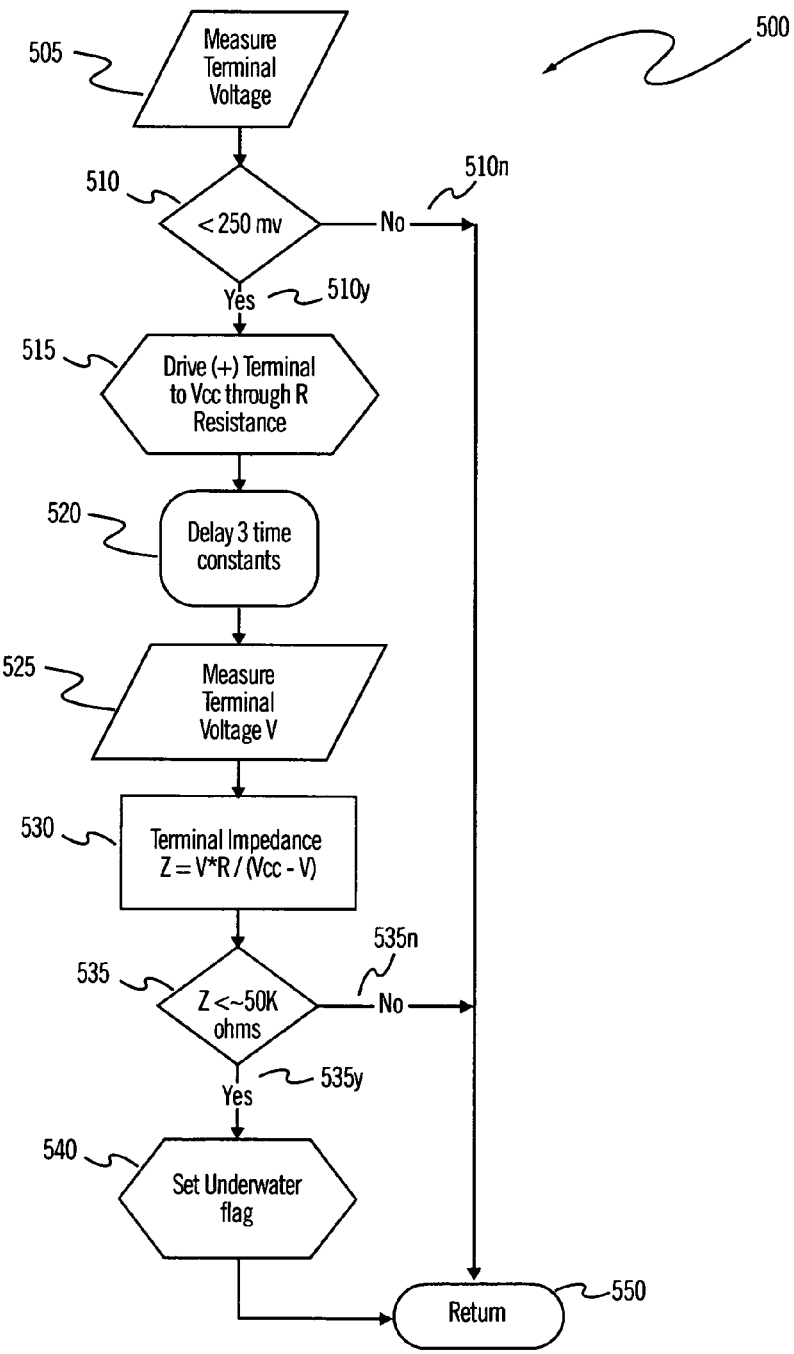
FIG. 5 is the flow chart for the process of detecting whether the input-output leads are wetted.

The detection of whether the device 100 is underwater is performed using the process 500 shown in the flowchart of FIG. 5 by measuring the impedance across the I/O leads 140. Fresh water will provide an impedance of less than 50 kΩ across the leads 140 and salt water will provide an impedance of less than 20 kΩ across the leads 140, while air will provide an impedance of considerably more than 50 kΩ across the leads 140. The process 500 begins by measuring 505 the voltage across the I/O leads 140, and determining 510 whether the voltage is less than 250 mV. If the voltage is not 510n less than 250 mV, then a voltage is being applied to the leads 140, either for programming, data retrieval, or battery charging, and the process returns 550. However, if the voltage is 510y less than 250 mV, then a voltage of $V_{cc}$ is applied 515 to the positive voltage I/O lead 140a by way of the resistor R7 (shown in FIG. 2B) having a resistance of 3.3 kΩ. After a delay 520 of three times the time constant for capacitor C7 and resistor R7, i.e., roughly 50 microseconds, the voltage V across the leads 140 is measured 525. The impedance Z across the leads 140 is then determined 530 according to the formula $Z=V*R/(V_{cc}-V)$. It is then determined 535 whether the impedance Z is less than 50 kΩ. If the impedance Z is 535y less than 50 kΩ, then an underwater flag is set 540 and the underwater detection process 500 returns 550. If the impedance Z is not 535n less than 50 kΩ, then the underwater flag is not set and the underwater detection process 500 returns 550.

Figure 6:
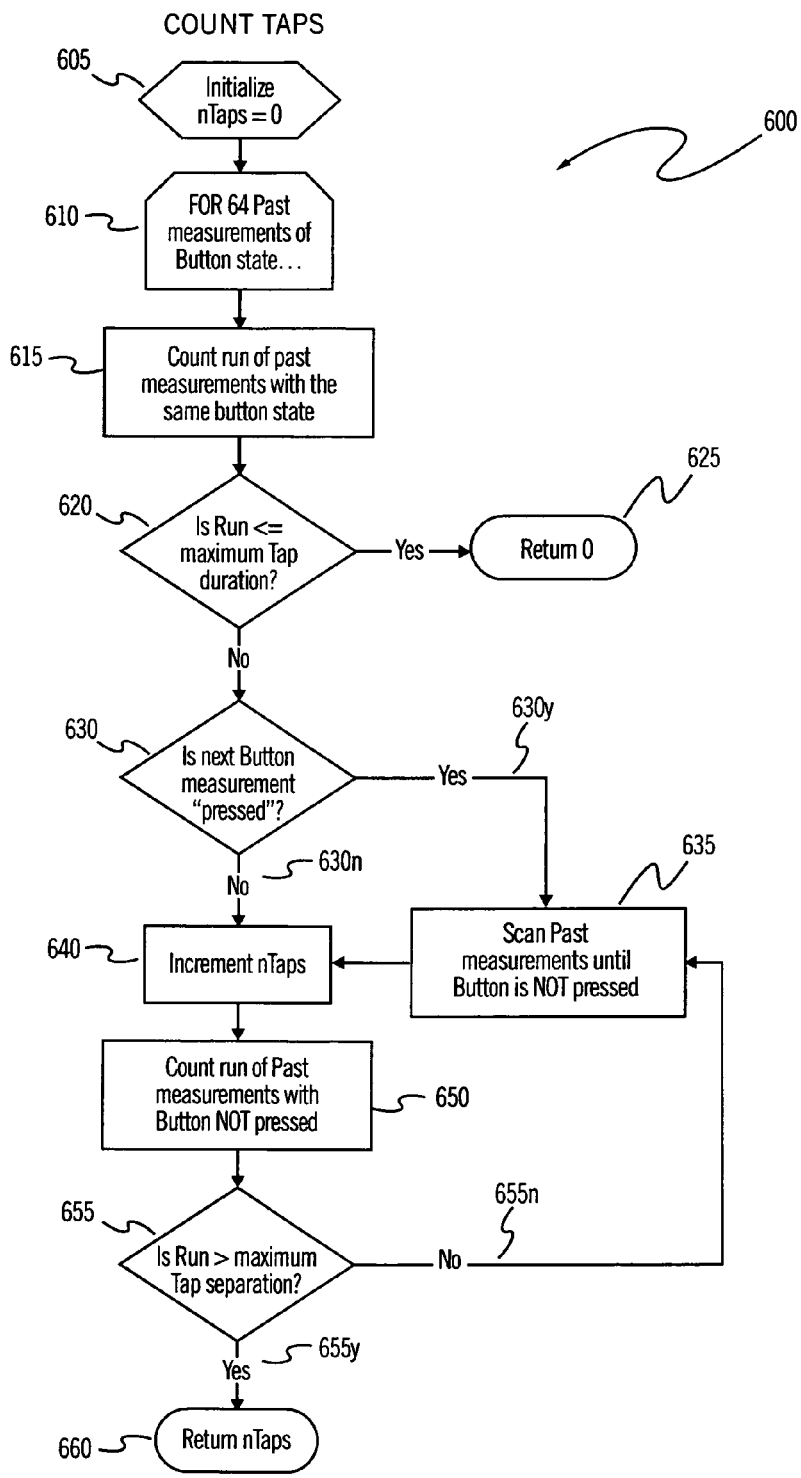
FIG. 6 is the flow chart for the method of counting taps on the beam-interrupt button.

The counting of taps on the beam-interrupt button 130 is performed using the process flow 600 shown in the flowchart of FIG. 6. The process 600 begins by initializing 605 a counter nTaps to a value of zero. Then a FOR loop 610 is implemented to examine in reverse chronological order each of the past sixty-four measurements of the state of the beam-interrupt button 130. Measurements are spaced sixty-two milliseconds apart, so the FOR loop monitors the activity on the button 130 for roughly the last four seconds. (Although not depicted in FIG. 6, each of the sixty-four button-state measurements is a combination of twelve measurements of the state of the beam taken approximately five milliseconds apart.) The first operations within the FOR loop 610 are to count 615 the run of the number of measurements which have the same state as the current state of the beam-interrupt button 130, and determine 620 whether the run is less than the maximum "tap duration," which is taken to be five consecutive measurements. If the run is 620y less than the maximum tap duration, then the user may still be in the process of tapping on the button 130 and a value of zero is returned 625. However, if the run is not 620n less than the maximum tap duration, then it is determined 630 whether the next measurement (i.e., the one previous in time) to the run is the pressed state. If not 630n, then the counter nTaps is incremented 640 by one. If it is 630y the pressed state, then the following measurements (i.e., the ones previous in time to that) are scanned until a not-pressed state is reached 635, and then the counter nTaps is incremented 640 by one. After the counter nTaps is incremented 640 by one, the next run of not-pressed states is counted 650, and it is determined 655 that the run has a length greater than the maximum tap separation. If so 655y, then the user has stopped tapping and the number of taps nTaps is returned 660.

Figure 7:
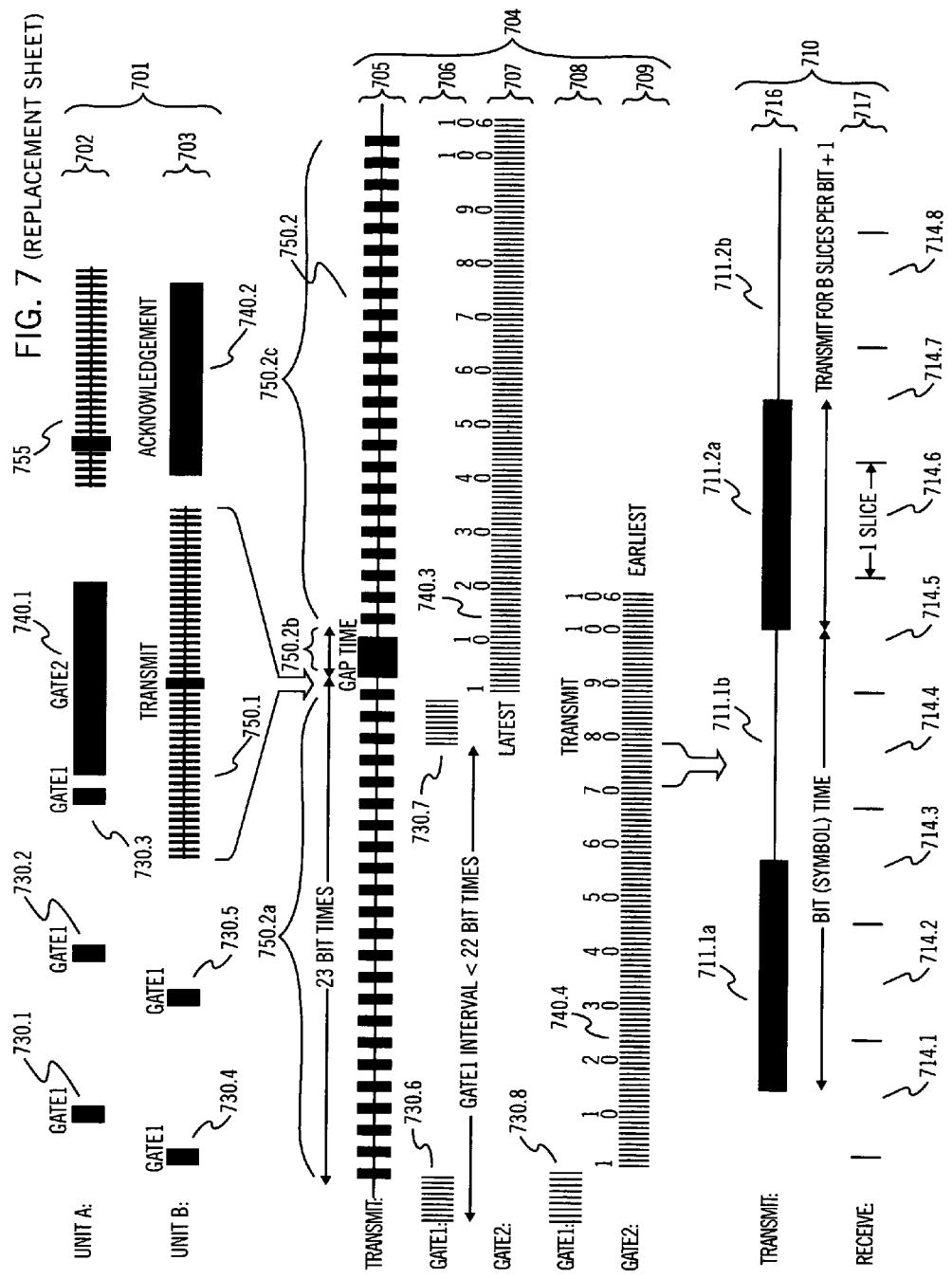
FIG. 7 is a timing diagram for transmission and reception of communication signals, and a series of exploded views of the initial timing diagram.

FIG. 7 shows timelines with exemplary communications by the devices 100 of the present invention. The first group of two timelines 701 shows receptions and transmissions of a Unit A 100 and a Unit B 100, on timelines 702 and 703, respectively. Unit A 100 listens at regular intervals for transmissions by the other device (Unit B 100) during Gate 1 reception windows 730.1, 730.2, and 730.3. (Gate 1 reception windows will be referenced generically or collectively with the reference numeral 730.) Similarly, Unit B 100 listens at regular intervals for transmissions by the other device (Unit A 100) during Gate 1 reception windows 730.4 and 730.5. In the preferred embodiment the starting points of Gate 1 reception windows 730 of a device 100 are separated by twenty-two bit lengths. Generally, the Gate 1 reception windows of the two devices 100 are displaced from each other. In the example shown, Unit B 100 begins a signal transmission 750.1 after its second Gate 1 reception window 730.5, and the third Gate 1 reception window 730.3 of Unit B 100 occurs during this transmission 750.1. (Signal transmissions will be referenced generically or collectively with the reference numeral 750.) In contrast to the previous reception windows 730.1, 730.2, 730.4 and 730.5 of both devices 100 where there was no transmission from the other device 100 to be received, the reception of a portion of the transmission 730.3 from Unit B by Unit A 100 induces Unit A 100 to receive during an extended reception window, Gate 2 reception window 740.1. Upon Unit A 100 receiving the portion of the transmission 750.1 which overlaps with the Gate 2 reception window 740.1, Unit A 100 sends an acknowledgement signal 755, which is the portion of the transmission 750.1 just received, beginning after a known delay time. And Unit B 100, expecting an acknowledgement listens for the acknowledgement signal 755 during a reception window 740.2 begun after an appropriate delay.

The next group of timelines 705, 706, 707 and 708 (referred to collectively with reference numeral 704) shows a magnified view of a single transmission packet 750.2, such as the transmission packet 750.1, Gate 1 reception windows 730.6 and 730.7 in timeline 706, Gate 2 reception window 740.3 in timeline 707, Gate 1 reception window 730.8 in timeline 708, and Gate 2 reception window 740.4 in timeline 709. The transmission packet 750.2 consists of an initial 23-bit Golay code 750.2a, followed by an intermediate gap 750.2b having a length of 2.5 bits, followed by a repetition of the initial 23-bit Golay code 750.2c. (Generically, the initial 23-bit Golay code, intermediate gap, and repetition of the initial 23-bit Golay code will be assigned reference numerals 750a, 750b and 750c, respectively.) As shown in the magnified timeline 716 of two bits 711.1 and 711.2 and the magnified timeline 717 of sampling slices 714.1 through 714.8, there are four sampling slices per bit length, and the bit transmissions have an inter-symbol pause of 50%, i.e., each bit 711.1 and 711.2 has an initial transmission portion 711.1a and 711.2a followed by an inter-symbol pause 711.1b and 711.2b in the transmission of equal length. Each inter-symbol pause 711.b allows the multi-path delay spread from echoes and the ringing of the transducer 115 to die down before the next symbol is transmitted. Therefore, the characteristic time for the ringing of the transducer 115 and the echoes should be smaller than the length of the inter-symbol pauses 711.b.

It should be noted that in the gap 750b there is also a 0.5 bit length pause after the transmission period of two bit lengths, so that the initial Golay code 750a and the repeated Golay code 750c are separated by 2.5 bit lengths. (Bits will be generically or collectively referred to with reference numeral 711 and slices will be generically or collectively referred to with reference numeral 714.) The integer-plus-one-half bits length of the gap 750b aids in the process of locating the gap 750b because those slices 714 which occur during the transmissions 711.a in the first 23-bit Golay code 750.a occur during the pauses 711.*b* between transmissions 711.*a* in the second 23-bit Golay code 750.*c*, and vice versa. Each bit 711 in the first and second 23-bit Golay codes 750.*2a* and 750.*2c* is a 57 kHz or 58 kHz transmission, and the intermediate gap 750.*2b* is a 56 kHz transmission. The Gate 1 reception windows 730 consists of eight slices, i.e., the Gate 1 reception windows 730 have a length of two bit times. The Gate 2 reception windows 750 consist of 106 slices 714, i.e., the Gate 2 reception windows 750 have a length of 26.5 bit times.

The beginnings of Gate 1 reception windows 730 are separated by 22 bit times, insuring that a complete 23-bit code will be received in a Gate 2 reception window if a Gate 1 reception window 730 receives part of a transmission 750. At one extreme, which is depicted in timelines 706 and 707 in conjunction with timeline 705, the transmission 750.2 begins immediately after the end of a Gate 1 reception window 730.6. The next Gate 1 reception window 730.7 therefore falls within the initial 23-bit Golay code 750.2*a* of the transmission 750.2, allowing Unit A 100 to determine that a transmission has been sent during that Gate 1 reception window 730.7. Upon determining that a transmission has been sent (by a process discussed in detail below in conjunction with FIG. 8), Unit A 100 then performs a Gate 2 reception window 740.3 having a length of 26.5 bits. As is apparent from timelines 705 and 707, the Gate 2 reception window 740.3 is long enough to receive the last bit of the first 23-bit Golay code 750.2*a*, the gap 750.2*b*, and the entirety of the repeated 23-bit Golay code 750.2*c*.

At the other extreme shown in timelines 708 and 709 (in conjunction with timeline 705), where the Gate 1 reception window 730.8 is one slice 714 later than Gate 1 reception window 730.6 of timeline 706, the last slice of the Gate 1 reception window 730.8 overlaps with the first bit of the initial 23-bit Golay code 750.2*a* of the transmission 750.2. Upon determining that a transmission has been sent, Unit A 100 then performs a Gate 2 reception window 740.4. As is apparent from the timelines 705 and 709, the Gate 2 reception window 740.4 is long enough to receive the second bit of the initial 23-bit Golay code 750.2*a* on through the entirety of the initial 23-bit Golay code 750.2*a*, the gap 750.2*b*, and the first bit of the repeated 23-bit Golay code 750.2*c*.

Figure 12:
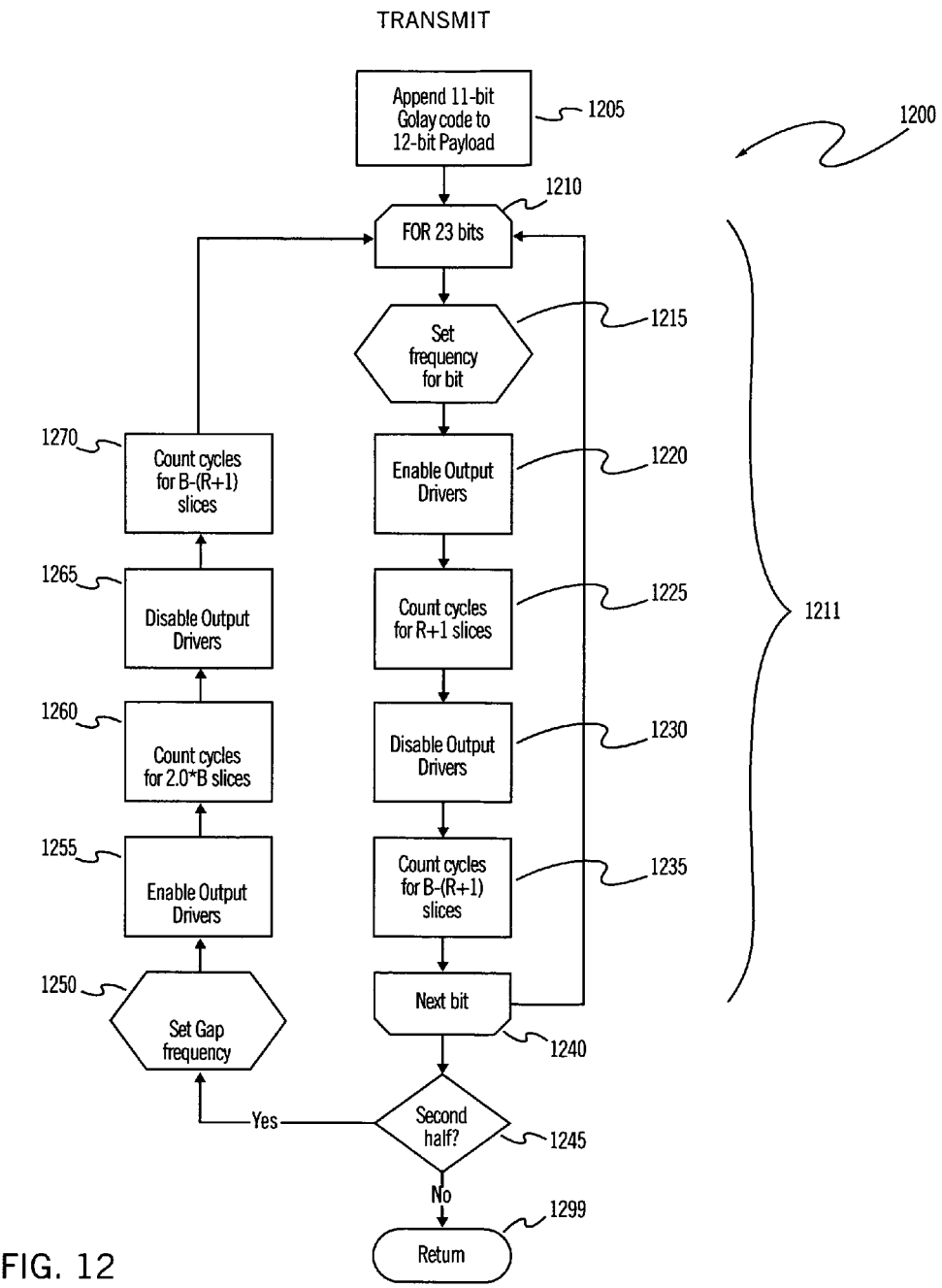
FIG. 12 is a flow chart for the transmission process.

The process 1200 of transmitting a signal is shown in the flowchart of FIG. 12. The process 1200 begins with the appending of eleven bits 711 to a 12-bit payload to create a 23-bit Golay code. Then, for each of the 23 bits, a FOR loop 1211 which begins at box 1210 transmits the initial portion 750*a* of the transmission. First, the frequency for each bit is set 1215. Binary frequency-shift keying is used, and in the preferred embodiment the frequency (referred to as either Freq1 or $\omega_1$ in the present specification) used for zero bits is 58 kHz and the frequency (referred to as either Freq2 or $\omega_2$ in the present specification) used for unity bits is 57 kHz, and in the gap 750*b* a frequency of 56 kHz is transmitted. The output drivers 250 are then enabled 1220 and the appropriate frequency is transmitted for the number of cycles of the sinusoid which fits into R+1 slices 714, where R+1 is the number of slices over which transmission occurs in each bit of the Golay code. In the preferred embodiment of the present invention, R=1, and, as discussed above and shown in FIG. 7, each bit 711 consists of B=4 slices 714. After the transmission 1225, the output drivers 250 are disabled 1230 and the number of cycles of the sinusoid which fits into (B−(R+1)) slices 714 is counted 1235 before proceeding 1240 to the next bit 711. After all 23 bits of a Golay code have been transmitted, a branch 1245 is made depending on whether the Golay code just transmitted was the Golay code of the first portion 750*a* of a transmission or the Golay code of the second portion 750*c* of a transmission. If it was not 1245*n* the transmission of the first half 750*a*, then the process 1200 returns 1299. If it was 1245*y* the transmission of the first half 750*a*, then the gap transmission frequency of 56 kHz is set 1250, the output drivers 250 are enabled 1255, and the number of cycles of the sinusoid which fits into 2B slices 714 is counted 1260 before disabling 1265 the output drivers 250. (Since it is less problematic to detect an off-frequency signal than to detect a lack of signal due to the possibility of detecting echoes, a sinusoid is transmitted during the gap 750*b*, rather than not transmitting during this period.) Then the number of cycles of the gap sinusoid which fit into (B−(R+1)) slices 714 is counted 1235 before proceeding to the FOR loop 1211 for transmission of the second half 750*c* of the signal. It should be noted that this produces a shift, modulo the bit length, of one half of a bit between the initial Golay code 750*a* and the repeated Golay code 750*c*.

Figure 8:
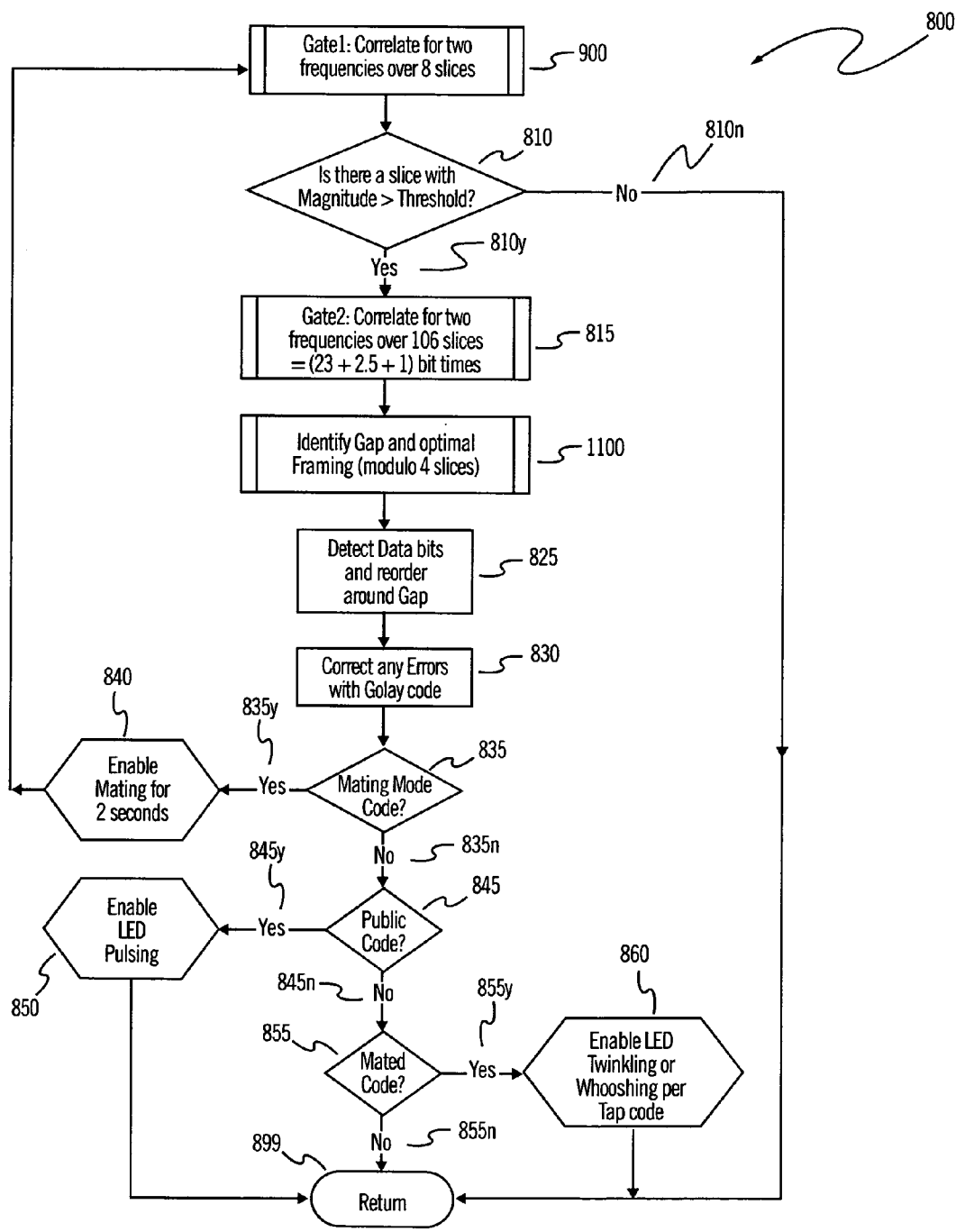
FIG. 8 is a flow chart of the reception process.

The process 800 of listening for and receiving a transmission packet 750 is shown in the flowchart of FIG. 8. The process 800 begins with a Gate 1 reception window 730 where sine and cosine correlations are calculated 900 (as discussed in detail below in conjunction with FIG. 9) for the two (non-gap) transmission frequencies (57 kHz and 58 kHz) for each of the eight slices 714 in the Gate 1 reception window 730. Then it is determined whether the reception in any of the slices 714 has power at one of the two transmission frequencies above a threshold value. If not 810*n*, then the process 800 returns 899. However, if 810*y* there is power in any slice 714 above the threshold value, then correlations (i.e., where in the present specification "correlations" are the Fourier sine and cosine components for the two transmission frequencies over a slice 714, as described in detail below in conjunction with FIG. 10) are calculated 815 for each of the one-hundred-and-six slices 714 in the following Gate 2 reception window 740. From the correlations, the gap 750*b* is located and an optimal framing of the slices 714 relative to the bits 711 is determined 1100 (as discussed in detail below in conjunction with FIG. 11). Then the 23-bit Golay code of the transmission is determined 825 by a reordering of the bits 711, and if there have been any errors in the reception these are corrected 830 using the correction procedures available for Golay codes. It is then determined 835 whether the operation code is a mating-initiation instruction, and if so 835*y* then the device 100 flashes its LEDs 230 to indicate that and begins a mating procedure 840. If the received operation code is not 835*n* a mating-initiation instruction, then it is determined 845 whether the received code is a public code, and if so 845*y* the device 100 begins pulsing 850 the LEDs 230 to indicate that a public code has been received. If the received code is not 845*n* a public code, then it is determined 855 whether the received decode is a mated code (i.e., it has a decode which is being used for communications between the device 100 and other devices 100 to which it is mated), and if so 855*y* the device 100 flashes 860 the LEDs 230, and creates a tone or series of tones by parametric downmixing, corresponding to the tap code received. If the received code is not 855*n* a mated code, then the process 800 returns 899.

Figure 9:
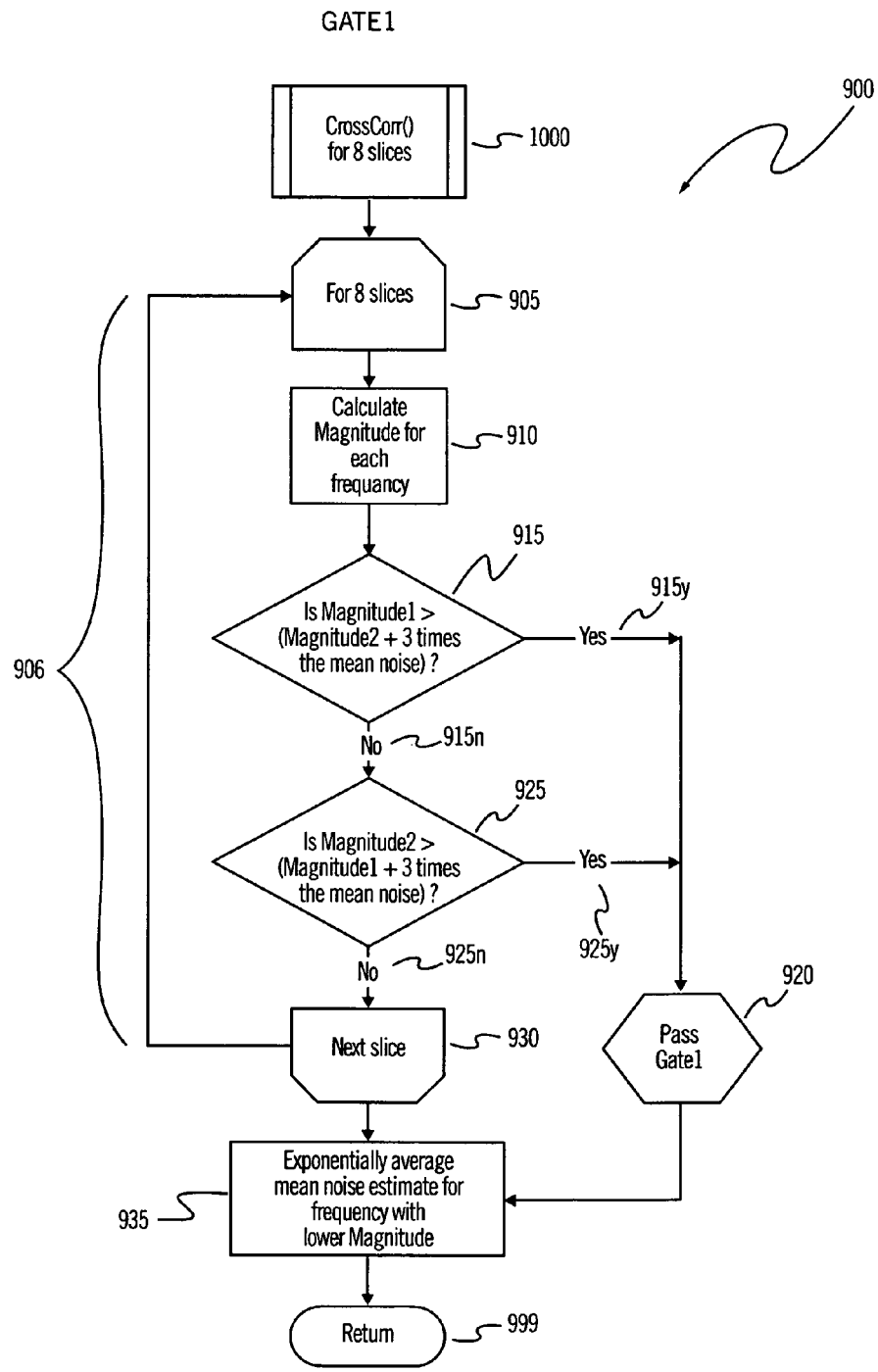
FIG. 9 is a flow chart of the incident signal detection process.

The Gate 1 reception process 900 is shown in detail in FIG. 9. The process 900 begins by computing correlations for the two (non-gap) transmission frequencies for each of the eight slices 714 in the Gate 1 reception window 730. Then, for 905 each of the eight slices 714, a FOR loop 906 implemented. The FOR loop 906 begins by calculating the power at each of the two transmission frequencies. It is then determined 915 whether the power received at the lower frequency, Power1, is greater than three times the mean noise plus the power received at the higher frequency, Power2. If so 915*y*, then the Gate 1 reception window 730 has received a bit at the lower frequency, so a Gate1 reception is considered to have occurred 920, i.e., the Gate 1 stage is "passed." If not 915n, then it is determined 925 whether the power received at the higher frequency, Power2, is greater than three times the mean noise plus the power received at the lower frequency, Power1. If so 925y, then the Gate1 stage is passed 920. If not 925n, then the FOR loop cycles 930 for examination of the next slice 714. Once the Gate 1 stage is passed 920 or all the slices 714 have been examined by the FOR loop 906, the noise (which is taken to be the power in the frequency with the lower power, i.e., Min[Power1, Power2]) is added to an exponential average for the mean noise, and the process returns 999. In particular, the $j^{th}$ estimation of the mean noise c is calculated according to $$\sigma_j = \alpha * \text{Min}[\text{Power1, Power2}] + (1-\alpha) * \sigma_{j-1}, \tag{1}$$

where in the preferred embodiment $\alpha = 1/16$.

Figure 10:
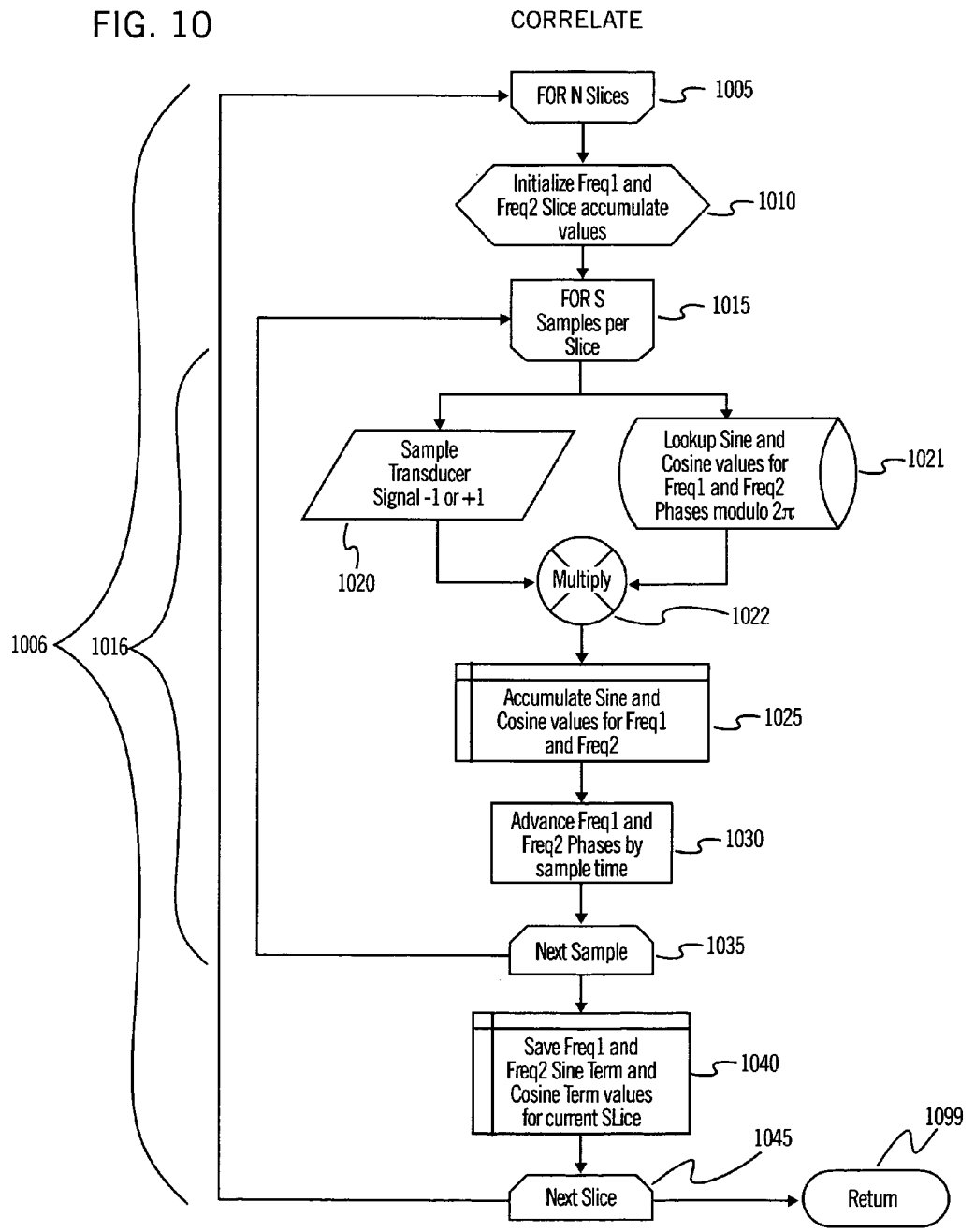
FIG. 10 is a flow chart for the process of calculating correlations.

The process 1000 of computing the "correlation" between the incoming signal $\phi_i(t)$ and sines and cosines at the non-gap transmission frequencies of Freq1 and Freq2 (which in the case of the preferred embodiment are 57 kHz and 58 kHz) is shown in FIG. 10. The process 1000 consists of a FOR loop 1006 for the N slices 714 to be examined. The process 1000 begins by entering 1005 the FOR loop 1006, and the accumulations (described below) for sine and cosine at Freq1 and Freq2, $\omega_1$ and $\omega_2$, are zeroed. Then a FOR loop 1016 for the number of samples S per slice 714, where in the preferred embodiment S is a few thousand, is entered 1015. The signal $\phi_i(t)$ received at the transducer 115 is sampled and digitized 1020 to only one bit of resolution and assigned a value of +1 if the signal is greater than or equal to zero and −1 if the signal is less than zero. The values of sine and cosine at a phase corresponding to the sample number j are looked up 1021 from a look-up table, and multiplied 1022 with the digitized transducer signal and accumulated (i.e., added to a running sum) for the sine and cosine at both frequencies. Then the phase is advanced 1030 by one sample time and the next 1035 sample is considered. The sine and cosine accumulations $A_{sin}$ and $A_{cos}$ for a slice 714 for frequencies $\omega_1$ and $\omega_2$ is therefore given by $$A_{sin}(\omega_n) = \sum_{j=0}^{S-1} [\phi_i(t_0+j\varepsilon)]_{-1}^{+1} \sin(\omega_n(t_0+j\varepsilon)), \tag{2}$$

and $$A_{cos}(\omega_n) = \sum_{j=0}^{S-1} [\phi_i(t_0+j\varepsilon)]_{-1}^{+1} \cos(\omega_n(t_0+j\varepsilon)), \tag{3}$$

where $t_0$ is the time at the beginning of the slice 714, the quantity in square brackets is quantized to positive unity if it has a value greater than zero and quantized to negative unity if it has a value less than zero, and $\varepsilon = \Delta t/S$ where $\Delta t$ is the time length of a slice 714. As can be seen from equations (2) and (3), the sine and cosine accumulations $A_{sin}$ and $A_{cos}$ are effectively the sine and cosine Fourier transforms, respectively, of square wave versions of the incoming signal $\phi_i(t)$. The quantization of the received signal $\phi_i(t)$ to one bit is sufficient because the accumulation values $A_{sin}$ and $A_{cos}$ are unambiguous for strong signals, and all that can be obtained anyway for weak signals. Once all the samples in a slice 714 have been considered, the FOR loop 1016 terminates, the sine and cosine accumulations $A_{sin}$ and $A_{cos}$ at both frequencies $\omega_1$ and $\omega_2$ are saved 1040 and the next 1045 slice 714 is considered in the FOR loop 1006. When all the slices 714 have been considered, the process 1000 returns 1099.

Figure 11:
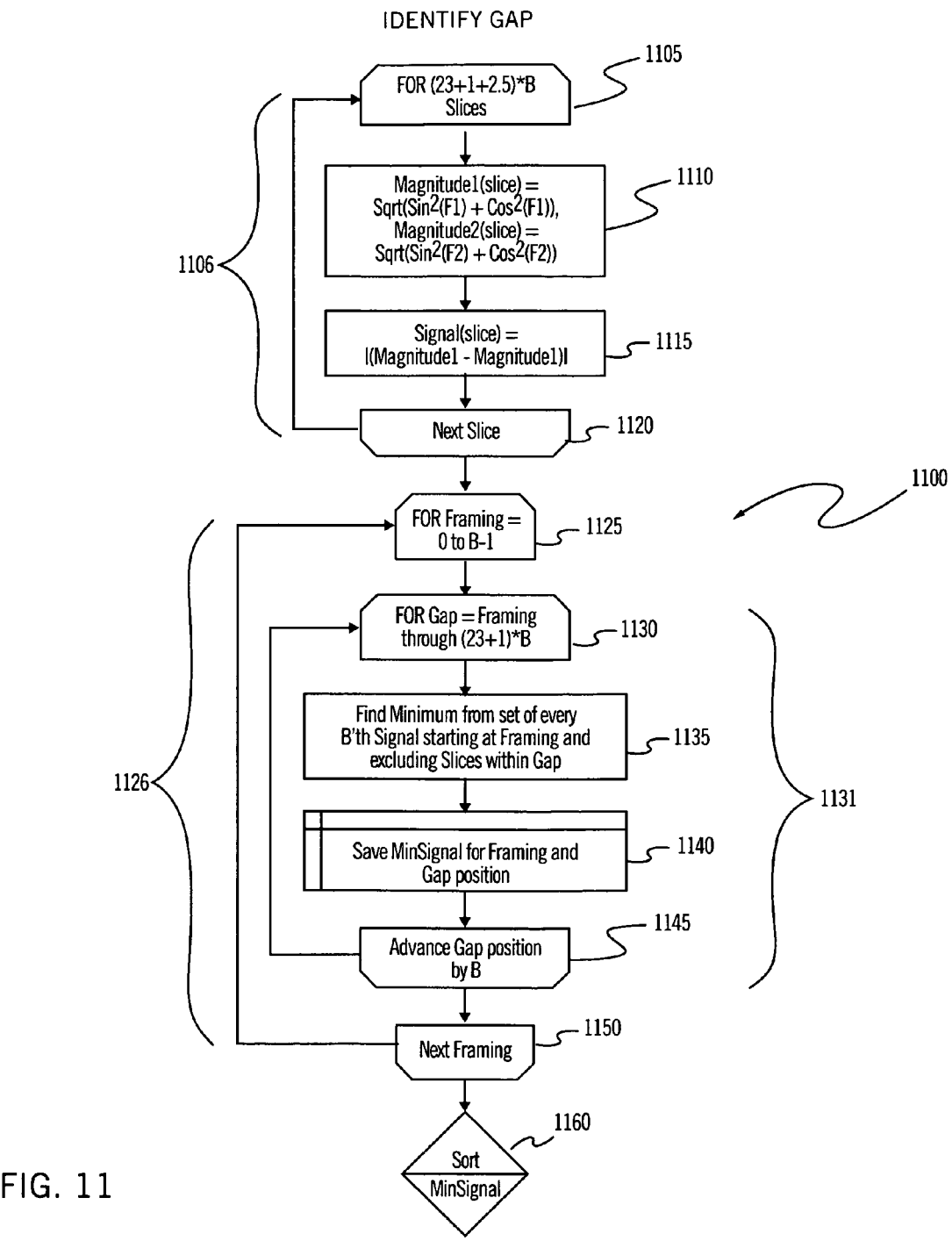
FIG. 11 is a flow chart for the process of locating the gap between the Golay codes in a transmission.

The process 1100 of identifying the gap 750b in a transmission packet 750 is shown in the flowchart of FIG. 11. The process 1100 begins by entering 1105 a FOR loop 1106 for (N+G+1)*B slices, where N is the number of bits in the Golay codes (i.e., 23), G is the bit length of the gap 750b and, as before, B is the number of slices 714 per bit 711. The magnitude M at both frequencies $\omega_1$ and $\omega_2$ is calculated 1110 for each slice 714 according to $$M(\omega_1) = \sqrt{(A_{sin}(\omega_1))^2 + (A_{cos}(\omega_1))^2}, \tag{4}$$

and $$M(\omega_2) = \sqrt{(A_{sin}(\omega_2))^2 + (A_{cos}(\omega_2))^2}, \tag{5}$$

and the signal magnitude is calculated 1115 for each slice 714 according to $$\Delta = |M(\omega_1) - M(\omega_2)|. \tag{6}$$

The start and finish times of the gap 750b are then identified by a FOR loop 1131 within a FOR loop 1126. The outer FOR loop 1126 steps a variable called Framing through the B slices 714 within each bit 711. The inner FOR loop 1131 steps a variable called Gap through the first (N+1) bits 711 in the signal $\phi_i(t)$ under consideration. A trial positioning of the gap 750b is set at the Gap$^{th}$ bit 711, and then the minimum of the signal magnitude $\Delta$ from the Framing$^{th}$ slice 714, (Framing+B)$^{th}$ slice 714, (Framing+2B)$^{th}$ slice 714, etc. before the trial gap 750b, and the (Framing+2+nB)$^{th}$ slice 714, (Framing+2+(n+1)*B)$^{th}$ slice 714, (Framing+2+(n+2)*B)$^{th}$ slice 714, etc. after the gap (i.e., excluding those slices 714 within the trial positioning of the gap 750b and shifting by the length of the gap 750b modulo the bit length) is selected 1135 and saved 1140 as the variable MinSignal. If the trial positioning of the gap 750b corresponds to the actual positioning of the gap 750b, then MinSignal will not be particularly small compared to all the situations where the trial positioning of the gap 750b differs from the actual positioning of the gap 750b. This is because when the trial positioning of the gap 750b differs from the actual positioning of the gap 750b, at least one slice 714 is examined where there is no power at either $\omega_1$ or $\omega_2$ and so the value of the signal magnitude $\Delta$ is small. Therefore, after completion of the FOR loops 1126 and 1131, the MinSignal values are sorted 1160 and the largest of the MinSignal values corresponds to the trial positioning of the gap 750b that best reflects the actual position of the gap 750b.

Figure 13:
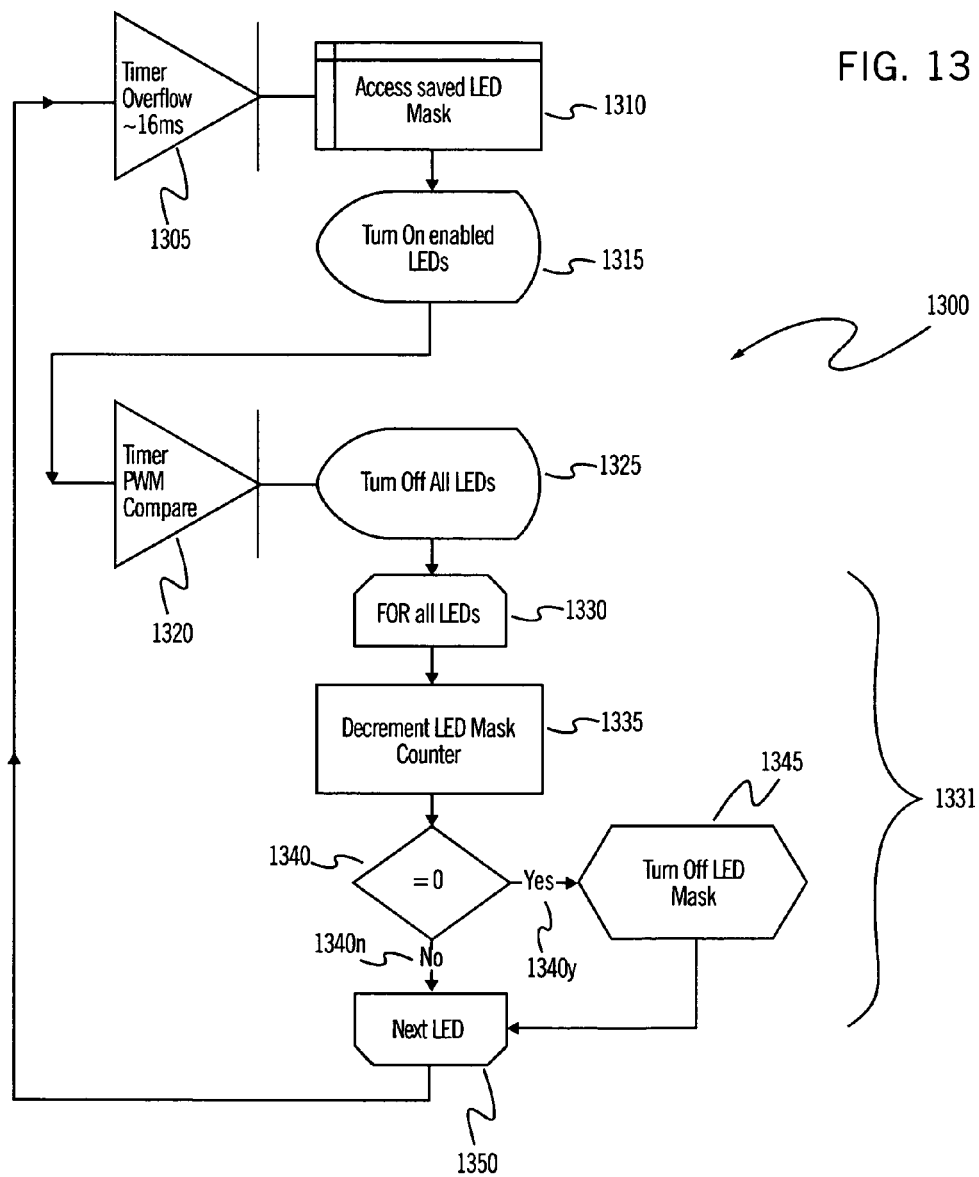
FIG. 13 is a flow chart for the pulse-width modulation method for controlling the LEDs.

The process 1300 of pulse-width modulation for the LEDs 230 is shown in the flowchart of FIG. 13. A timer begins 1305 the process 1300 every 16 milliseconds by accessing an LED mask that specifies which of the LEDs 230 are to be turned on, and the LEDs 230 specified by the mask are turned on 1315. Then another timer waits 1320 the amount of time which the LEDs 230 are supposed to be on before turning off 1325 all the LEDs 1325. Then a FOR loop 1331 is entered where for 1330 all the LEDs 230, a mask counter is decremented 1335. The mask counter specifies for each LED 230 how many times it is to be turned on. It is then determined 1340 whether the mask counter has a value of zero. If 1340y the counter for a particular LED 230 has been decremented to zero, then the mask bit which specifies whether further flashings of the LED 230 is required is turned off 1345. Once the mask counters for all the LEDs 230 have been updated in the FOR loop 1331, the process loops back to the timer 1305.

Figure 14:
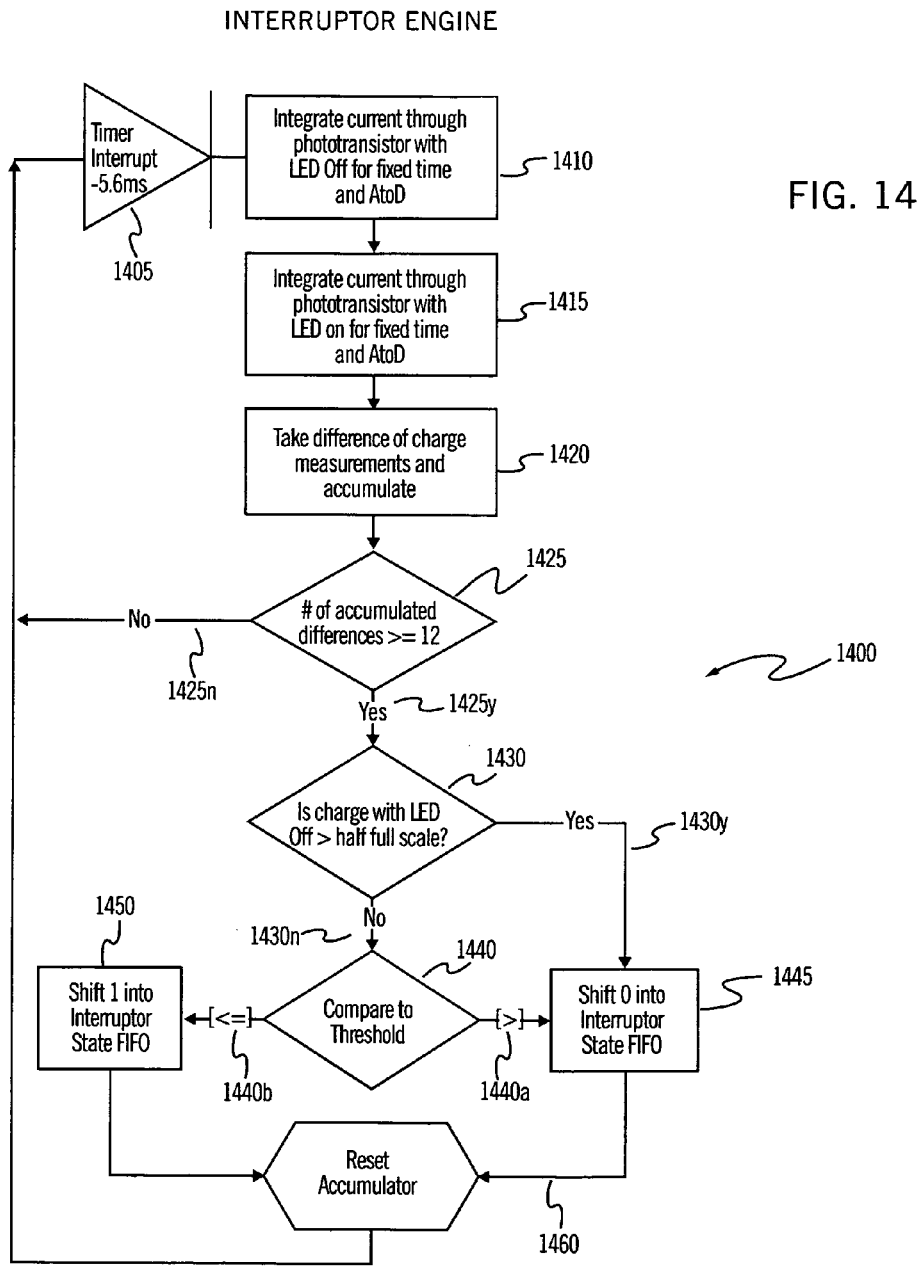
FIG. 14 is a flow chart for the interruptor engine which monitors the beam-interrupt button.

The process 1400 for the Interruptor Engine which fills a buffer of states for the beam-interrupt button 130 is shown in the flowchart of FIG. 14. A timer begins 1405 the process 1400 every 5.6 milliseconds by integrating 1410 for a fixed time (and converting to a digital value) the current produced by the phototransistor of the infra-red detector 117 during a period when the LED of the infra-red emitter 118 is off. Then, the current produced by the phototransistor of the infra-red detector 117 is integrated 1415 for a fixed time (and converted to a digital value) while the LED of the infra-red emitter 118 is on. The difference between the two values is taken 1420 and accumulated (i.e., added to a running total). It is then determined 1425 whether the number of accumulated values is greater than or equal to twelve. If not 1425n, then the process 1400 loops back to the timer step 1405. If so 1425y, then it is determined 1430 whether the charge produced when the LED of the infra-red emitter 118 was off was greater than half the full-scale value. If so 1430y, the ambient light is considerable and a value of zero is shifted 1445 into a FIFO (first in, first out) buffer and the accumulator is cleared 1460. If the charge produced when the LED of the infra-red emitter 118 was off was not 1430n greater than half the full-scale value, then the charge accumulated difference is compared 1440 to a threshold value. If the accumulated difference is less than or equal to 1440a the threshold, then the button 130 is "depressed" so a value of one is shifted 1445 into the FIFO buffer and the accumulator is cleared 1460. However, if the accumulated difference is greater than 1440b the threshold, then the button 130 is not being depressed so a value of zero is shifted 1445 into the FIFO buffer and the accumulator is cleared 1460. The buffer stores 64 bits, so the buffer represents the last 64×12× 5.6 milliseconds=4.3 seconds of button states.

Thus, it will be seen that the inventions and improvements presented here are consistent with the object of the invention described above. While the description contains many specifics, these should not be construed as limitations on the scope of the invention but rather as exemplifications of preferred embodiments thereof. A small sampling of the alternatives is: the "flashing" of a light or lights may be a change of state of any sort, such as a change in color, a change in brightness, an on-to-off transition or off-to-on transition; the device may be additionally tethered to the strap of a divers mask with a lanyard; the device may be secured to the glass of the divers mask using a means other than a suction cup; the device may be secured to the divers mask outside the range of vision of the diver, and the light from the LEDs may be conducted to within the range of the diver's vision using a light pipe or multiple light pipes, thereby reducing the amount which the system obstructs a diver's vision; the light-emitting ends of the aforementioned light pipe may be attached to a fit into a socket on a clear suction cup which is attachable to the glass of the diver's mask; an extended tap of say 3 seconds while underwater may be used as a public-channel emergency or distress signal, and all devices within range of the emergency signal may respond by a flashing of their red LEDs or yellow LEDs or alternating between the flashing of their red and yellow LEDs, etc.; another light source, such as a vertical cavity surface emitting laser, may be used for the light emitter of the beam-interrupt button; if a device has been underwater for over two hours it can be assumed that the device or diver is lost and so the device may transmit a lost/tracking signal every 60 seconds, and if other devices detect the lost/tracking signal they may respond with a signal that will cause the lost device to increase the frequency of transmission of its lost/tracking signal to facilitate the location of the device; if an acknowledgement is not received in response to a communication within an expected round-trip communication time, the original communication is resent; the binary frequency-shift frequencies used can differ from those described; the binary frequency-shift frequencies can be assigned to the bit values and the gap differently than the assignments described; the particular time intervals specified may differ slightly or significantly, and values for resistances, capacitances, voltages, etc. may differ slightly or significantly; air cavities around the lenses of the beam-interrupt button emitter and detector may be formed by other means, or focusing or collimation of the light from the emitter may be accomplished by other means; etc. It should also be noted that components of the device and method of the present invention may be used in systems other than a transceiver. For instance, a power source, interior portions of input/output leads, a computation unit and a sensor may be completely encapsulated in plastic as taught in the present specification to provide a device for monitoring a diving variable (where "diving variable" is meant to be understood in a broad sense as an underwater variable of interest), such as the level of gas in a breathing tank, rate of ascent, depth. Accordingly, it is intended that the scope of the invention be determined not by the embodiments illustrated but, rather, by the appended claims and their legal equivalents.

What is claimed is:

1. A submergible sensing device, comprising:
   a rechargeable, non-removeable power source,
   a computation unit powered by said power source for generating outgoing signals and processing incoming signals,
   a pair of input/output leads connected to said rechargeable power source for recharging said rechargeable power source and connected to said computation unit for communication with said computation unit,
   a sensor for monitoring the state of a diving-relevant variable, and
   a chassis completely and permanently encasing said power source, said computation unit, said sensor, and interior portions of said input/output leads, exterior portions of said input/output leads being exposed to the environment.

2. The submergible sensing device of claim 1 wherein said chassis is a plastic which is molded around said power source, said computation unit, said sensor, and said interior portions of said input/output leads.

3. The submergible sensing device of claim 2 wherein said plastic is non-opaque.

4. The submergible sensing device of claim 2 wherein said plastic is translucent.

5. The submergible sensing device of claim 1 wherein said computation unit monitors impedance across said input/output leads to detect whether said input/output leads are submerged in water.

6. The submergible sensing device of claim 1 wherein said sensor monitors an air tank pressure.

7. The submergible sensing device of claim 1 wherein said sensor monitors a rate of ascent.

8. The submergible sensing device of claim 1 wherein said sensor monitors an ambient pressure.

9. The submergible sensing device of claim 1 wherein said input/output leads are connected to said computation unit via a programming interface.

10. The submergible sensing device of claim 9 wherein said communication with said computation unit includes programming of said computation unit and data uploading from said computation unit.

11. The submergible sensing device of claim 1 wherein said chassis has only two bosses and said pair of input/output leads pass through said two bosses.

12. A submergible sensing device, comprising:
   a power source, a computation unit powered by said power source for generating outgoing signals and processing incoming signals, a pair of input/output leads connected to said computation unit for communication with said computation unit, a submersion detector connected to said input/output leads, a sensor for monitoring the state of a diving-relevant variable, and a chassis completely and permanently encasing said power source, said computation unit, said sensor, and interior portions of said input/output leads, exterior portions of said input/output leads being exposed to the environment, facilitating monitoring by said submersion detector of impedance across said input/output leads to detect whether said input/output leads are submerged in water.

13. The submergible sensing device of claim 12 wherein said input/output leads are connected to said computation unit via a programming interface.

14. The submergible sensing device of claim 13 wherein said communication with said computation unit includes programming of said computation unit and data uploading from said computation unit.

15. The submergible sensing device of claim 12 wherein said submersion detector is implemented by said computation unit.

16. The submergible sensing device of claim 12 wherein said chassis has only two bosses and said pair of input/output leads pass through said two bosses.

17. A submergible sensing device, comprising:

a sensor for monitoring the state of a diving-relevant variable, a rechargeable, non-removeable power source, a submersion detector, a pair of input/output leads connected to said rechargeable power source for recharging said rechargeable power source and connected to said submersion detector for detecting submersion of said sensing device, a chassis completely and permanently encasing said power source, said sensor, said submersion detector, and interior portions of said input/output leads, exterior portions of said input/output leads being exposed to the environment facilitating monitoring by said submersion detector of impedance across said input/output leads to detect whether said input/output leads are submerged in water.

18. The submergible sensing device of claim 17 wherein said submersion detector is implemented by said computation unit.

19. The submergible sensing device of claim 17 wherein said chassis has only two bosses and said pair of input/output leads pass through said two bosses.

* * * * *